(12) United States Patent
Albrecht et al.

(10) Patent No.: US 6,826,004 B2
(45) Date of Patent: Nov. 30, 2004

(54) GRIPPER ASSEMBLY FOR INTERFACING WITH PORTABLE STORAGE DEVICES IN A STORAGE LIBRARY

(75) Inventors: Thomas Robert Albrecht, San Jose, CA (US); Robert Beverly Basham, Tucson, AZ (US); James Mitchell Karp, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 569 days.

(21) Appl. No.: 09/844,975

(22) Filed: Apr. 26, 2001

(65) Prior Publication Data

US 2002/0159183 A1 Oct. 31, 2002

(51) Int. Cl.[7] .................................................. G11B 15/18
(52) U.S. Cl. ....................................... 360/69; 369/30.46
(58) Field of Search ................................ 360/69, 98.07, 360/133, 98; 439/67; 700/218, 213; 711/4, 111, 112; 369/36, 34, 39, 30.46, 178.01

(56) References Cited

U.S. PATENT DOCUMENTS

| | | | | |
|---|---|---|---|---|
| 4,359,762 A | * | 11/1982 | Stollorz | .................... 360/98.07 |
| 5,204,794 A | * | 4/1993 | Yoshida | ....................... 360/133 |
| 5,303,214 A | | 4/1994 | Kulakowski et al. | |
| 5,427,489 A | | 6/1995 | Chalmers et al. | |
| 5,435,737 A | | 7/1995 | Haga et al. | |
| 5,517,373 A | * | 5/1996 | Hanson | ..................... 360/98.01 |
| 5,613,154 A | | 3/1997 | Burke et al. | |
| 5,752,257 A | | 5/1998 | Ripoll et al. | |
| 5,761,032 A | | 6/1998 | Jones | |
| 5,875,063 A | | 2/1999 | Corrington et al. | |
| 5,925,119 A | | 7/1999 | Maroney | |
| 5,966,266 A | | 10/1999 | Kato et al. | |
| 5,970,030 A | | 10/1999 | Dimitri et al. | |
| 6,014,675 A | | 1/2000 | Brewer et al. | |
| 6,022,180 A | | 2/2000 | Motoyama et al. | |
| 6,540,528 B2 | * | 4/2003 | Brodsky et al. | ............... 439/67 |
| 6,650,601 B1 | * | 11/2003 | Emberty et al. | .......... 369/30.46 |

OTHER PUBLICATIONS

U.S. patent application Ser. #09/843,665, filed on Apr. 26, 2001, entitled, "Storage Device Apparatus Having Multiple Interfaces", invented by DJ Winarski; JL Trall; RJ Means; and JE Kulakowski.

(List continued on next page.)

*Primary Examiner*—David Hudspeth
*Assistant Examiner*—K. Wong
(74) *Attorney, Agent, or Firm*—David W. Victor; Konrad Raynes & Victor LLP

(57) ABSTRACT

Provided is a method, system, and storage library for storing data. A data storage cartridge includes a data storage device and the data storage device includes a storage medium and a power supply. A transfer station includes an interface capable of mating with the data storage cartridge to perform data transfer operations with respect to the storage medium in the data storage device. A gripper assembly includes an interface capable of engaging the data storage cartridge and supplying power to the data storage device power supply. The gripper assembly further includes movement electronics for moving the data storage cartridge to the transfer station and inserting the data storage cartridge in the transfer station.

39 Claims, 28 Drawing Sheets

OTHER PUBLICATIONS

U.S. patent application Ser. #09/843,657, filed on Apr. 26, 2001, entitled, "An Automated Library System Including A Gripper Assembly Apparatus For Interfacing With A Storage Device", invented by DJ Winarski; JL Trall; RJ Means; and JE Kulakowski.

U.S. patent application Ser. #09/843,664, filed on Apr. 26, 2001, entitled, "Gripper Assembly Apparatus For Interfacing With A Storage Device", invented by DJ Winarski; JL Trall; RJ Means; and JE Kulakowski.

National Committee for Information Technology Standards, "Information Technology—SCSI-3 Medium Changer Commands (SMC)", Mar. 4, 1998, NCITS T10, Project 999D, Rev. 10a, Working Draft, pp. 1–68.

PCT Notification of Transmittal of the International Search Report or the Declaration, dated May 1, 2002, application No. PCT/US01/49515, filing date Dec. 29, 2001.

PCT Written Opinion, dated Dec. 19, 2002, application No. PCT/US01/49515, filing date Dec. 29, 2001.

U.S. patent application Ser. No. 09/842,030, filed on Apr. 26, 2001, entitled, "Storage Device Mounted in Portable Data Storage Media Type Cartidges", invented by JM Karp; TR Albrecht; GG Zamora; PM Greco; DM Davis; A Cox; and JR Blair.

* cited by examiner

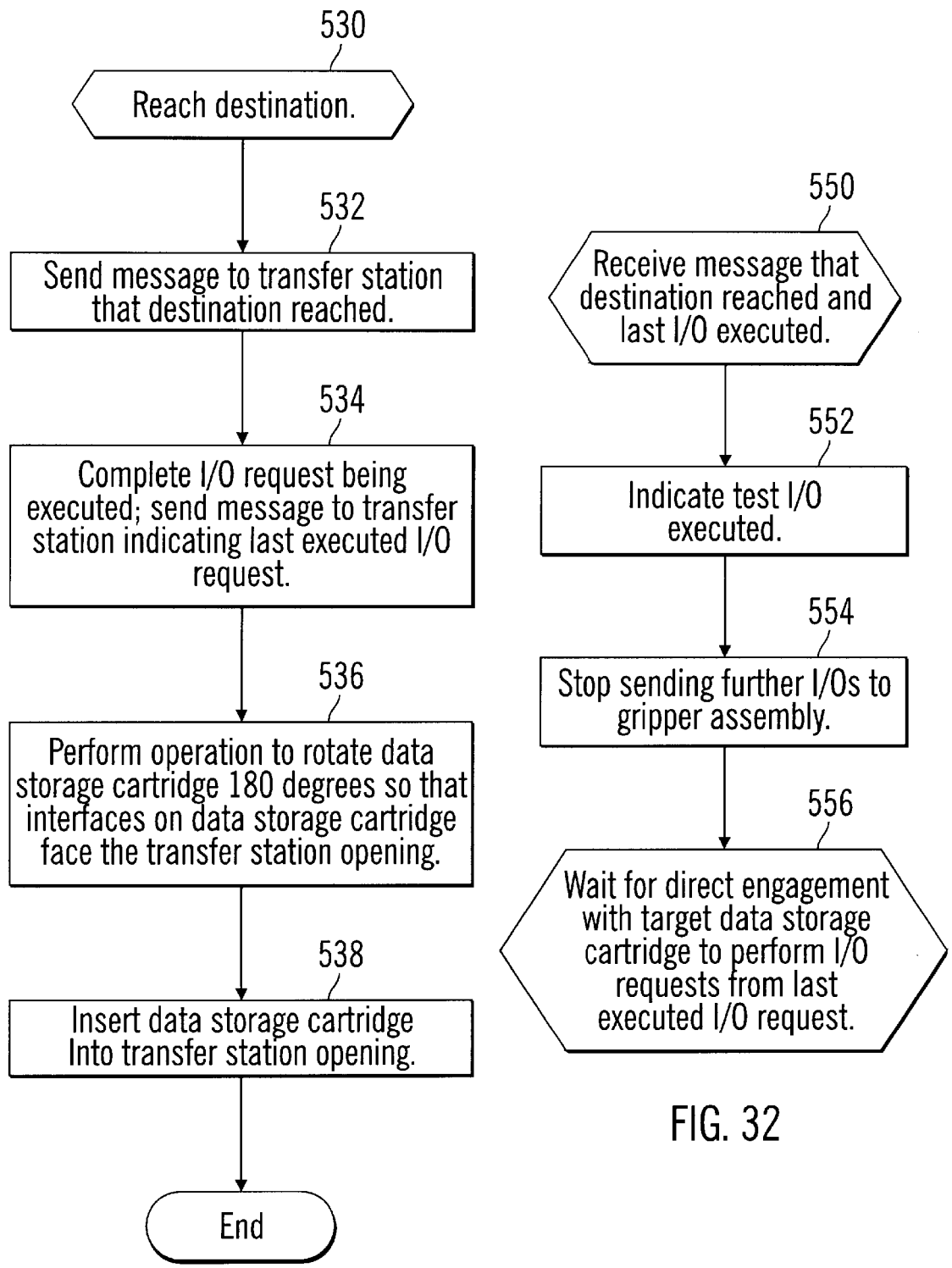

GRIPPER ASSEMBLY FOR INTERFACING WITH PORTABLE STORAGE DEVICES IN A STORAGE LIBRARY

BACKGROUND OF THE INVENTION

1. Field of the Invention

This invention relates to a storage library including a gripper assembly for interfacing with a portable storage device in the storage library.

2. Description of the Related Art

Tape data storage cartridges are relatively inexpensive and capable of storing large quantities of data. The tape data storage is inserted into a separate tape drive so that data may be read and/or written on the tape media. A library of numerous tape cartridges is used to store and archive large quantities of data. Such libraries may be implemented as an automated tape library which can contain large numbers of the cartridges on storage shelves and employ a robot gripper assembly to access a tape cartridge when needed and deliver the cartridge to a tape drive.

In an automated tape library, the tape cartridges are maintained on storage shelves. The gripper assembly, also referred to as a picker, accesses the tape cartridge from the shelves and moves the cartridge to a tape drive to read the content. Access times for tape cartridges in a tape library can be substantial, and include the time for the picker assembly to remove one tape cartridge already in the drive, move the removed cartridge to an available storage cell, and then move the target tape cartridge from the storage cell to the tape drive. Another substantial impact on tape drive performance in an automated library is the time needed to mount the cartridge and access a particular location in the cartridge storage. These factors substantially negatively impact I/O performance with respect to the tape cartridges in the library.

For these reasons, there is a need for an automated library of storage cartridges that provides improved performance with respect to accessing the storage cartridges.

SUMMARY OF THE INVENTION

Provided is a method, system, and storage library for storing data. A data storage cartridge includes a data storage device and the data storage device includes a storage medium and a power supply. A transfer station includes an interface capable of mating with the data storage cartridge to perform data transfer operations with respect to the storage medium in the data storage device. A gripper assembly includes an interface capable of engaging the data storage cartridge and supplying power to the data storage device power supply. The gripper assembly further includes movement electronics for moving the data storage cartridge to the transfer station and inserting the data storage cartridge in the transfer station.

Further, the gripper assembly interface may be capable of communicating data between the gripper assembly and the storage medium of the data storage device.

Still further, the gripper assembly may further include a controller implementing logic to receive an I/O request with respect to the data storage cartridge engaged in the gripper assembly. The received I/O request is executed and data related to the executed I/O request is transmitted.

Additionally, the transfer station may include a controller implement logic to receive an I/O request with respect to the data storage cartridge engaged by the gripper assembly and transmit the I/O request to the gripper assembly. In such case, the received I/O request executed by the gripper assembly controller is transmitted from the transfer station.

The described implementations provide a technique to supply power to a storage cartridge including a data storage device that includes a power supply and perform I/O operations before the storage cartridge is transferred to a destination transfer station or drive in the automated library. The gripper assembly that transfers the data storage cartridge may include power and data interfaces to provide power to the data storage cartridge so that the data storage cartridge is prepared for data transfer operations while en route from a storage shelf to the drive. Thus, by the time the gripper assembly reaches the transfer station, the data storage cartridge is ready to immediately begin executing I/O requests and transferring data. Moreover, I/O performance is further improved, because the gripper assembly may itself execute I/O requests before the cartridge actually reaches the transfer station drive.

BRIEF DESCRIPTION OF THE DRAWINGS

Referring now to the drawings in which like reference numbers represent corresponding parts throughout:

FIGS. 28–32 illustrate logic performed by the components in the automated library to execute I/O requests directed toward data storage cartridges in the library.

DETAILED DESCRIPTION OF THE INVENTION

In the following description, reference is made to the accompanying drawings which form a part hereof and which illustrate several embodiments of the present invention. It is understood that other embodiments may be utilized and structural and operational changes may be made without departing from the scope of the present invention.

Automated Library Including Hard Disk Drive Storage Cartridges

Figure 1:
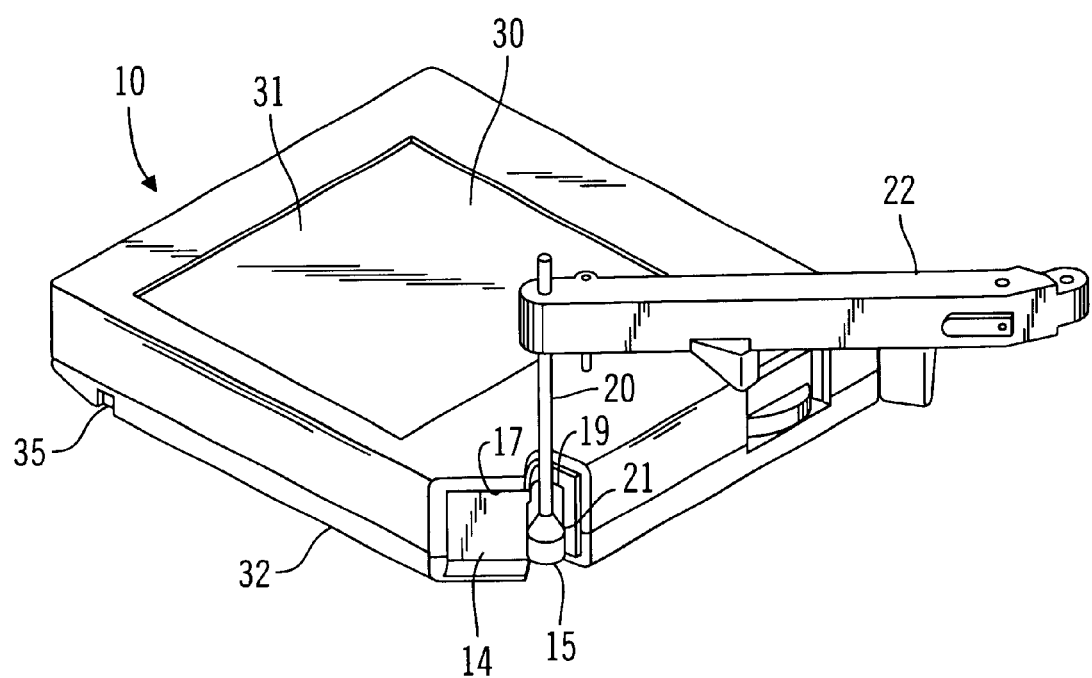
FIG. 1 is an isometric view of a prior art magnetic tape cartridge and leader block interlocked with a prior art leader block threading pin.
Figure 2:
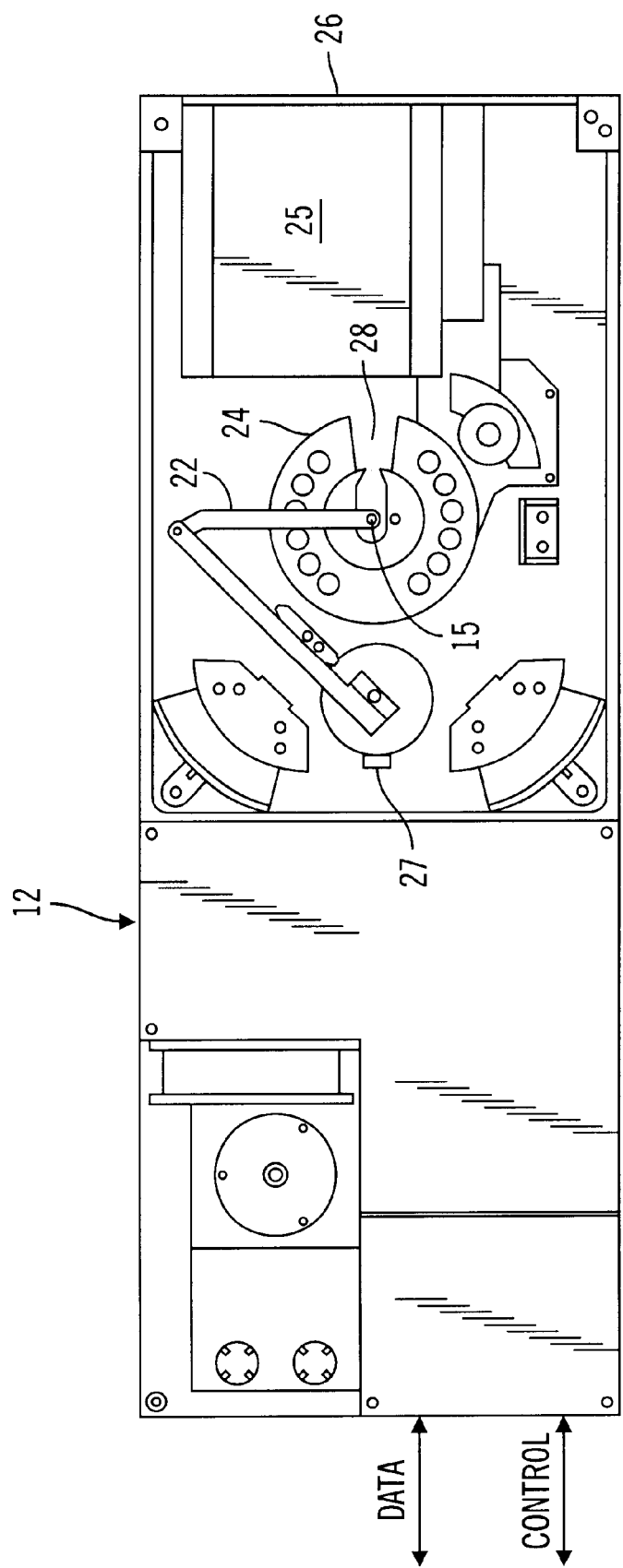
FIG. 2 is a diagrammatic illustration of a prior art magnetic tape drive employing a prior art leader block threading pin.

Referring to FIGS. 1 and 2, prior art data storage cartridges 10 typically comprise a data storage media, such as magnetic tape, which are inserted into a separate prior art data storage drive 12 so that the data may be read and/or written on the data storage media.

The cartridge 10 must be have an opening or be openable so that the media can be inserted into the data storage drive. In the case of a single reel magnetic tape cartridge, the tape has a leader block 14 which is engaged by a threading pin 15, and then threaded into the data storage drive 12. The leader block 14 recesses and nests in an opening 17 of the cartridge, which, in the case of an International Business Machines Corporation (TM) ("IBM") 3480/3490 type magnetic tape cartridge, is in one corner of the cartridge. The leader block is connected to a leader of the magnetic tape which is stored on a reel within the cartridge. The leader block has a hole 19 therethrough into which the threading pin 15 is inserted. A shaft 20 of the threading pin is inserted into the hole and either the cartridge is lowered or the threading pin is raised so that a shaped cavity of the leader block 14 interlocks with an enlarged portion 21 of the threading pin.

The threading pin 15 is connected to an arm 22 which is operated by the data storage drive 12 for pulling the leader block out of the cartridge and threading the magnetic tape onto a reel 24. The tape cartridge 10 is loaded into a cartridge receptacle 25 through a slot 26, and the threading pin 15 engages the leader block 14. The arm 22 then transports the leader block with the magnetic tape leader from the receptacle 25 through various bearings and a read/write head 27 to a radial slot 28 in the reel 24 and to a central location in the reel. The reel 24 then turns to wind the tape past the read/write head 27 to read and/or write on the magnetic tape.

As shown in FIG. 1, the magnetic tape cartridge 10 comprises a generally rectangular cartridge shell 30 forming an exterior dimensional form factor, and which may have a top half 31 and a bottom half 32. A notch 35 is provided to interlock with a holder in a storage shelf of an automated data storage library which tends to hold the tape cartridge in position in the shelf.

Figure 3:
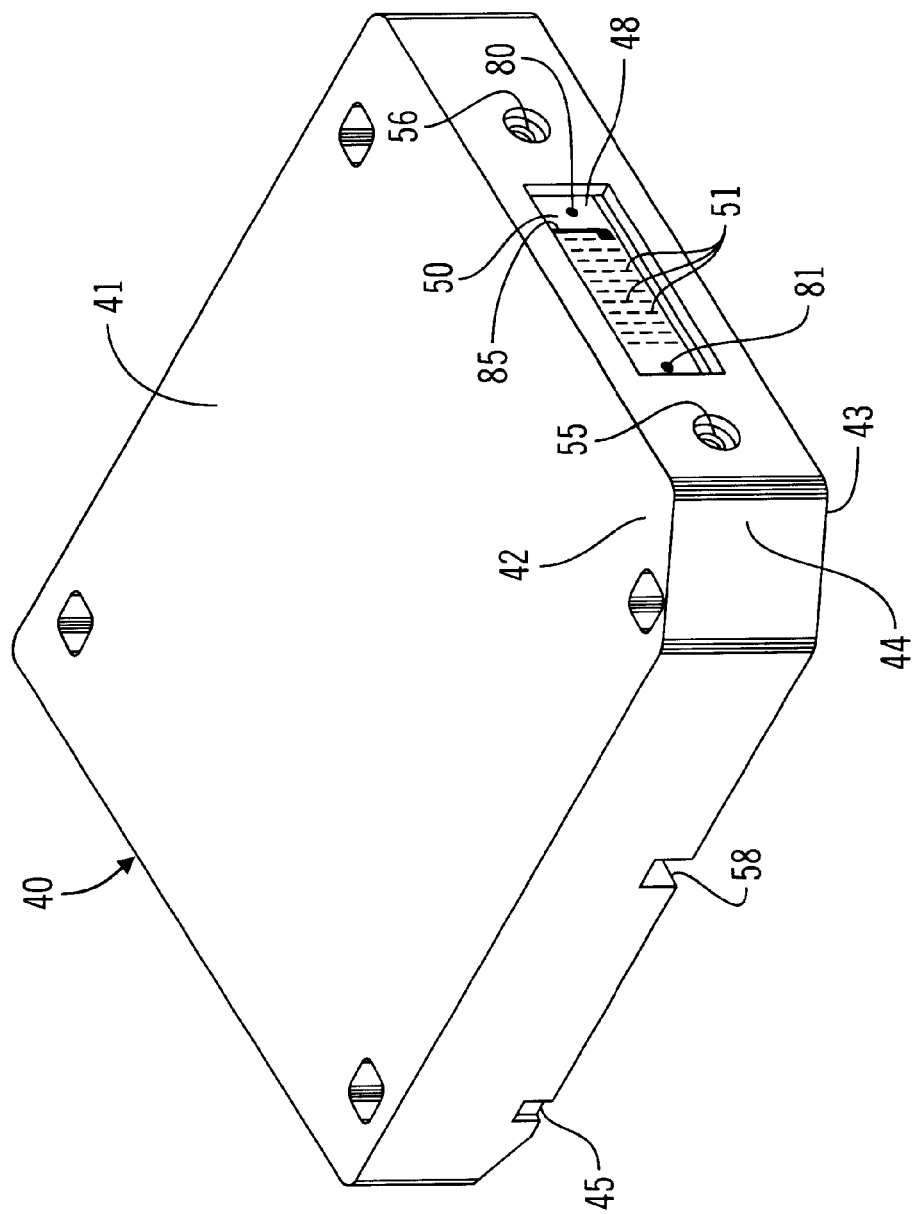
FIG. 3 is an isometric view of a portable data storage cartridge containing a data storage device in accordance with the present invention.

Referring to FIG. 3, a data storage cartridge 40 is provided having a cartridge shell 41 comprising a substantially identical exterior dimensional form factor as the tape cartridge 10 of FIG. 1 with the leader block 14. The data storage cartridge comprises a blocking portion 42 on at least one side of the location 17 of the tape cartridge leader block hole 19, to differentiate identification of the data storage cartridge 40 from the tape cartridge 10. In one aspect, the blocking portion 42 is opaque to optically block an optical source from a corresponding sensor, whereas the prior art leader block hole will transmit an optical beam, thereby differentiating the data storage cartridge 42 from a tape cartridge. Alternatively, or additionally, an opaque blocking portion 43 may be located on the opposite side of the data storage cartridge 40. In another aspect, a blocking portion 44 is located at a side of the location of the leader block hole at which the threading pin of FIG. 1 begins engagement of a tape cartridge by a tape drive of FIG. 2, and thereby prevents engagement of the data storage cartridge and provides the differentiated identification of the portable data storage cartridge.

A notch 45, similar to the notch 35 of tape cartridge 10 of FIG. 1, is provided to interlock with a holder in a storage shelf of an automated data storage library which tends to hold the data storage cartridge in position in the shelf.

As will be discussed, the cartridge shell 41 mounts a data handling agent, such as a data storage device, therein. Also as will be discussed, an external data transfer interface 48 is provided, incorporating a substantially flat substrate 50, having substantially flat electrical contacts 51 on a facing surface of the substrate. The electrical contacts 51 are coupled to the data handling agent, and are arranged to match electrical contacts of a transfer station, when in a face-to-face relationship.

Alignment, or registration, holes 55 and 56 are provided and mate with corresponding alignment pins of the transfer station to laterally align and register the data transfer interface of the portable cartridge 40 with a data transfer interface of the transfer station.

Figure 4:
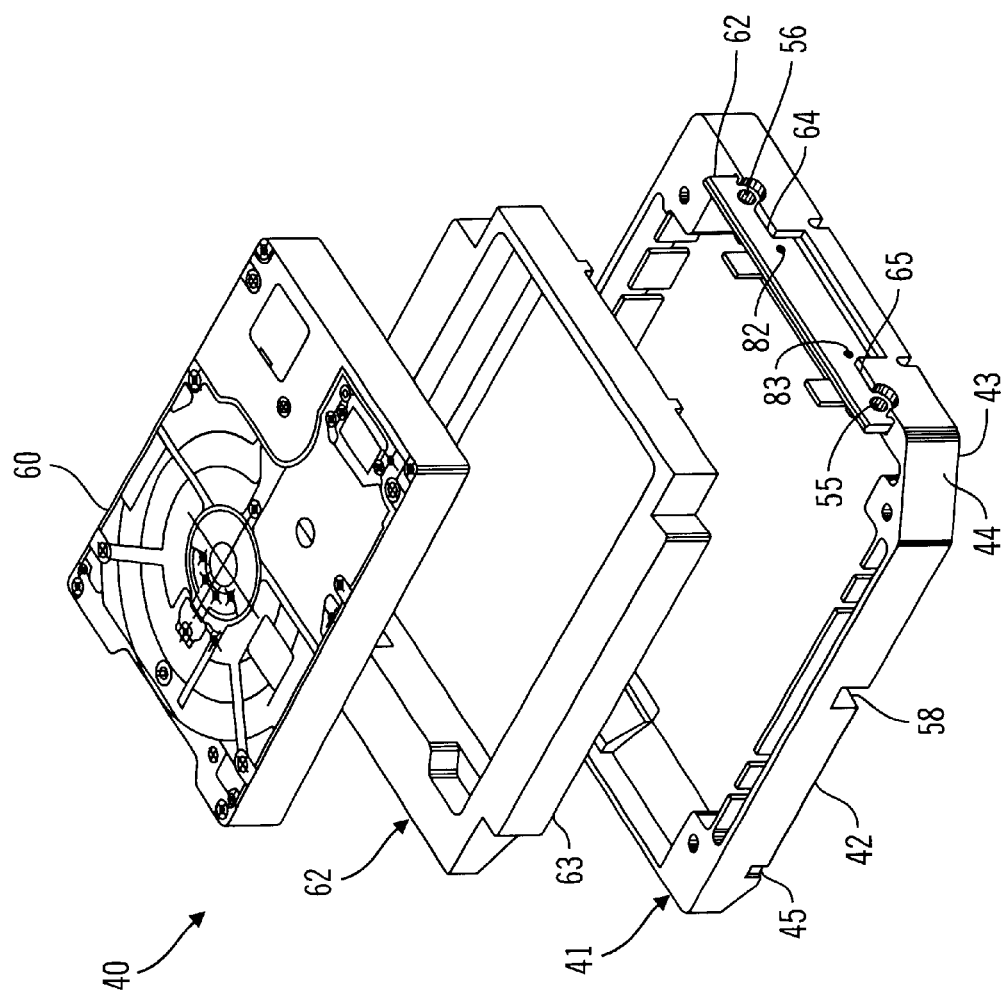
FIG. 4 is an exploded view of an example of a portable data storage cartridge of FIG. 3 containing an encased magnetic data storage drive.
Figure 5:
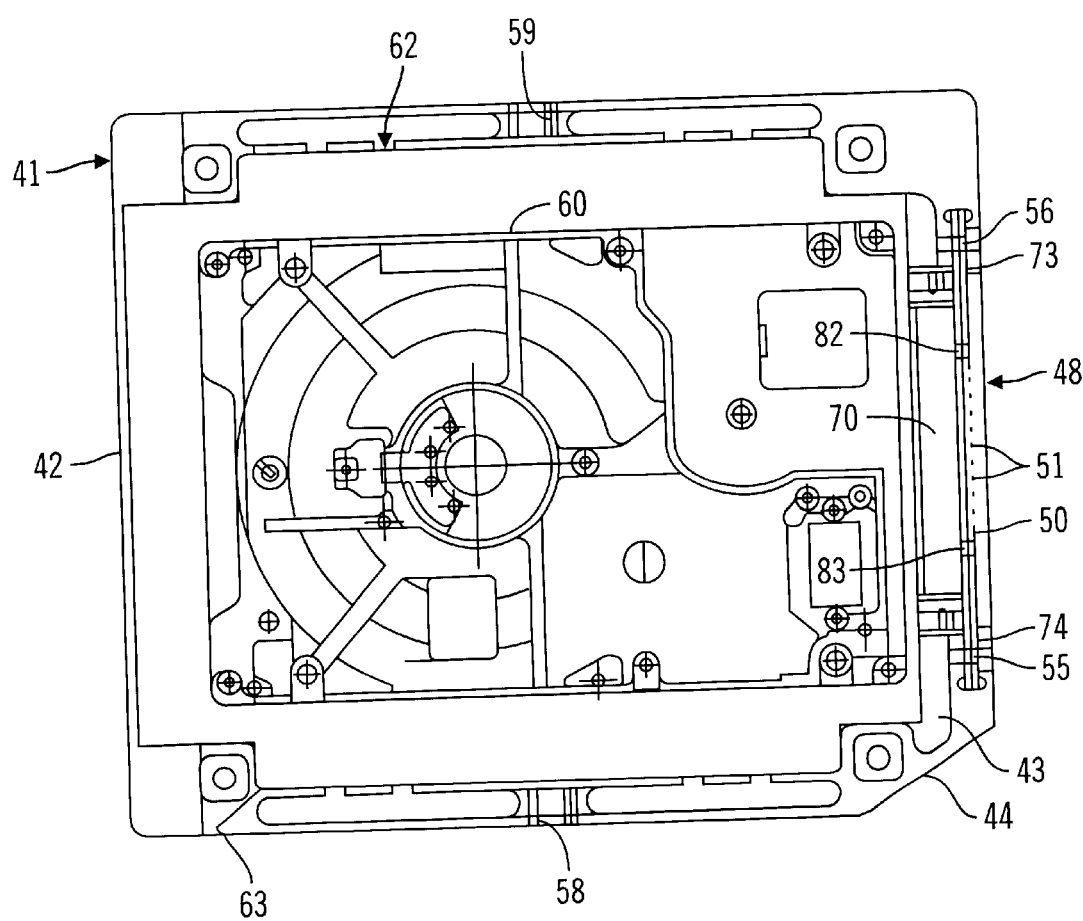
FIG. 5 is a plan view of the portable data storage cartridge of FIG. 4.

An exploded view of an example of a portable data storage cartridge 40 of FIG. 3 is illustrated in FIG. 4, and a plan view is illustrated in FIG. 5, and contains an encased magnetic data storage drive 60. An example of an encased magnetic data storage drive of the desired form factor to fit within the cartridge shell 41 comprises the IBM Travelstar 2.5 inch series of magnetic data storage drives. Specifically, FIGS. 4 and 5 illustrate the bottom half 42 of the cartridge shell 41.

Referring to FIGS. 3–5, in one aspect, notches 58 and 59 are provided to allow a loader of the transfer station to engage the portable data storage cartridge 40 and to force the electrical contacts 51 of the data transfer interface 48 into non-wiping contact with matching electrical contacts of the transfer station.

Figure 6:
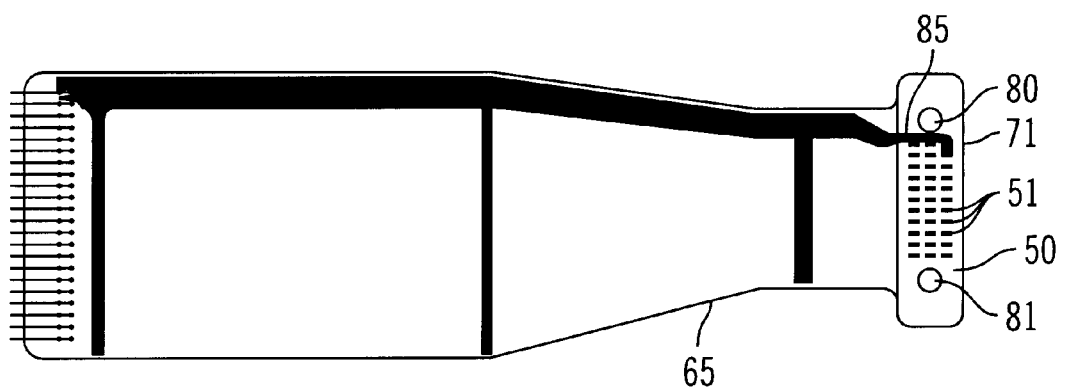
FIG. 6 is a plan view illustration of a flex cable of the portable data storage cartridge of FIG. 4.

In another aspect, a shock mount 62 supports and mounts the data storage device within the cartridge shell 41. Specifically, FIGS. 4 and 5 illustrate the bottom half 63 of the shock mount 62. The shock mount 62 is arranged to insure that the data storage device is fully separated from and isolated from potential mechanical contact with the cartridge shell or the data transfer interface 48. Referring additionally to FIG. 6, a flex cable 65 both provides the electrical contacts 51 and interconnects the data storage device and the external data transfer interface 48, while also isolating mechanical contact between the data storage device and the cartridge shell 41, thereby further insuring the full separation and mechanical isolation of the data storage device, such as the encased magnetic disk drive assembly 60, from the cartridge shell 41. As the result, the data storage device is protected from rough handling and is able to withstand the dropping of the cartridge, or misplacement the cartridge such that it is handled roughly, either through actions of a robot accessor or through manual handling.

Figure 7A:
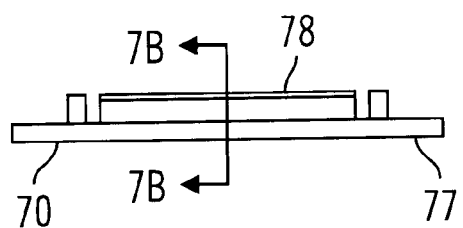
FIGS. 7A and 7B are respective top and cross-section views of a backing plate of the portable data storage cartridge of FIG. 4.
Figure 7B:
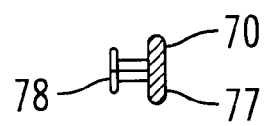
Figure 8:
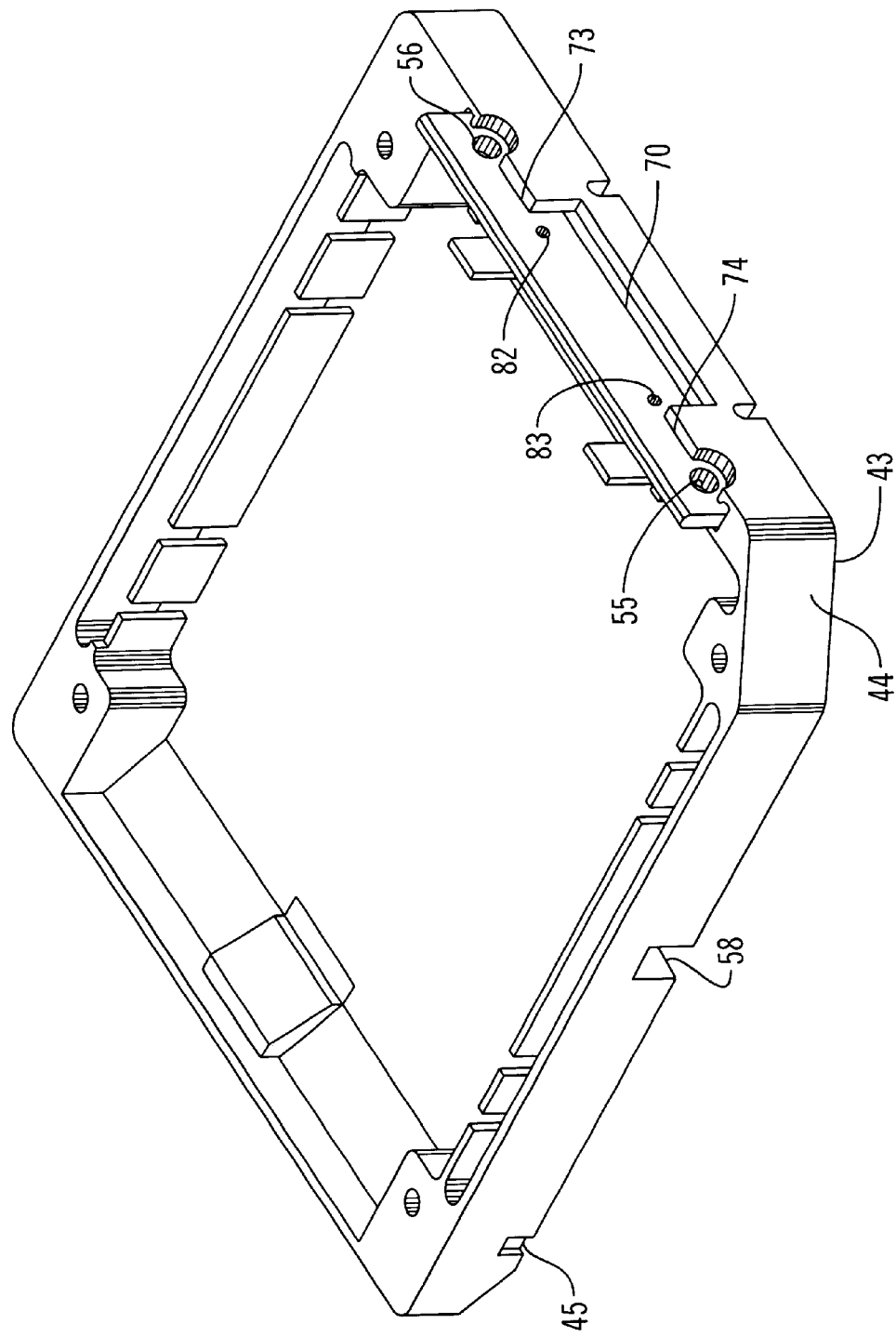
FIG. 8 is an isometric view of the bottom half of the cartridge shell of FIG. 4, with the backing plate of FIGS. 7A and 7B.
Figure 9:
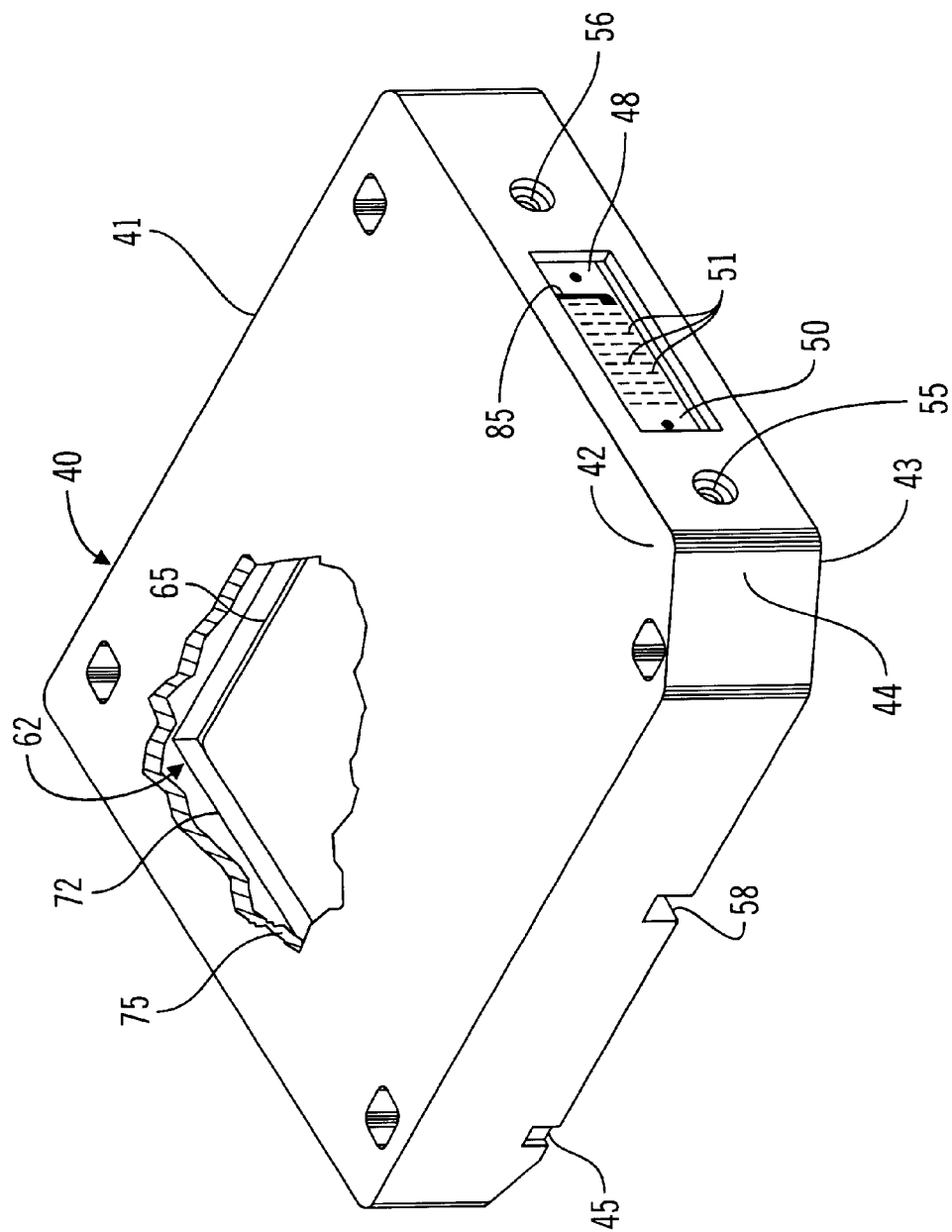
FIG. 9 is a partially cut away isometric view of the portable data storage cartridge of FIG. 4 illustrating the flex cable of FIG. 6.

Referring additionally to FIGS. 7A, 7B, 8 and 9, a substantially flat backing plate 70 is provided which supports and mounts a termination 71 of the flex cable 65, forming the external data transfer interface 48. The backing plate 70 and flex cable termination 71 snap into slots 73 and 74 in the cartridge shell 41 for mechanical support. The backing plate 70 thus supports and positions the facing surface 50 of the flex cable 65 to form the external data transfer interface. FIG. 9 also illustrates the top half 72 of the shock mount 62 and the top half 75 of the cartridge shell 41.

The flex cable 65 comprises a plurality of lands coupled to the flat electrical contacts 51 of the facing surface 50 at the termination 71, and are coupled to the data storage device, such as encased magnetic data storage drive 60.

The electrical contacts 51 of the substantially flat substrate facing surface 50 comprise gold pads, and preferably comprise copper pads on which are plated a diffusion barrier, such as nickel, and Type II gold pads plated on the diffusion barrier, but which are plated to a thickness greater than standard. As an example, the thickness of the gold pads is substantially 100 micro inches. As defined by those of skill in the art, a plating of about 8 micro inches is considered a "splash", about 15 micro inches is considered "adequate", and about 30 micro inches is considered "standard". The diffusion barrier is preferably plated to a thickness greater than 50 micro inches. Type II gold pads are also referred to as "hard gold" by those of skill in the art, and comprises a defined set of alloys. Preferably, the gold pads are electrolytically plated.

Further, at least ones of the electrical contacts 51 of the substantially flat substrate facing surface comprise elongated contacts, as will be discussed.

As illustrated by the cross section shown in FIG. 7B, the backing plate 70 is in the general form of an "I" beam, with a front portion 77 supporting and positioning the flex cable termination 71, and a rear portion 78 which provides structural strength. As will be discussed, the data storage cartridge 40, when loaded into the transfer station, will be subjected to considerable force in a direction normal to the facing surface 50, for example, over 10 pounds, to effect the non-wiping contact with the transfer station data transfer interface, requiring that the backing plate have considerable structural strength, for example, comprising a hard, durable plastic, such as manufactured by Ryton, called "Ultem" plastic.

In another aspect, the alignment, or registration, holes 55 and 56 are provided in the substantially flat backing plate 70 in close proximity to the substantially flat substrate 50. The substrate 50 of the flex cable termination 71 is aligned with respect to the backing plate 70 at the time of assembly by use of a probe inserted through holes 80 and 81 of the termination 71 and into holes 82 and 83, respectively, of the backing plate 70. Thus, the substantially flat substrate facing surface 50 is aligned with respect to the backing plate 70 and the alignment or registration holes 55 and 56 therein. The alignment holes are arranged for mating with corresponding transfer station alignment pins to register the external data transfer interface 48 with respect to the transfer station.

The flex cable 65, in addition to coupling with the data handling agent, or data storage device, to provide data transfer with the contacted transfer station, is coupled to a power element of the data handling agent to provide power from the transfer station to the power element.

In another aspect, when registered and aligned with the transfer station, the backing plate 70 is in contact with the alignment pins at holes 55 and/or 56. The backing plate 70 comprises a semiconductive plastic material having electrical resistivity. In one example, the material has sufficient embedded carbon to provide the electrical resistivity, comprising 20% carbon filled plastic. As an alternative, the backing plate 70 comprises two plates, one plate comprising the "I" beam, and the other plate, preferably in front of the "I" beam, and with the alignment holes, comprising a carbon filled semiconductive member. As an example, the carbon filled plate may comprise a 20% carbon filled polycarbonate, such as is available from the LNP Corporation, called "Stat-Kon DC-1004-FR". The backing plate is electrically coupled to the data storage device by means of land 85 of flex cable 65, to a ground thereof, thereby forming an electrostatic discharge path from the data storage device to the backing plate and through the electrically semiconductive material to the alignment pins of the transfer station, which are electrically grounded, as will be discussed.

Figure 10:
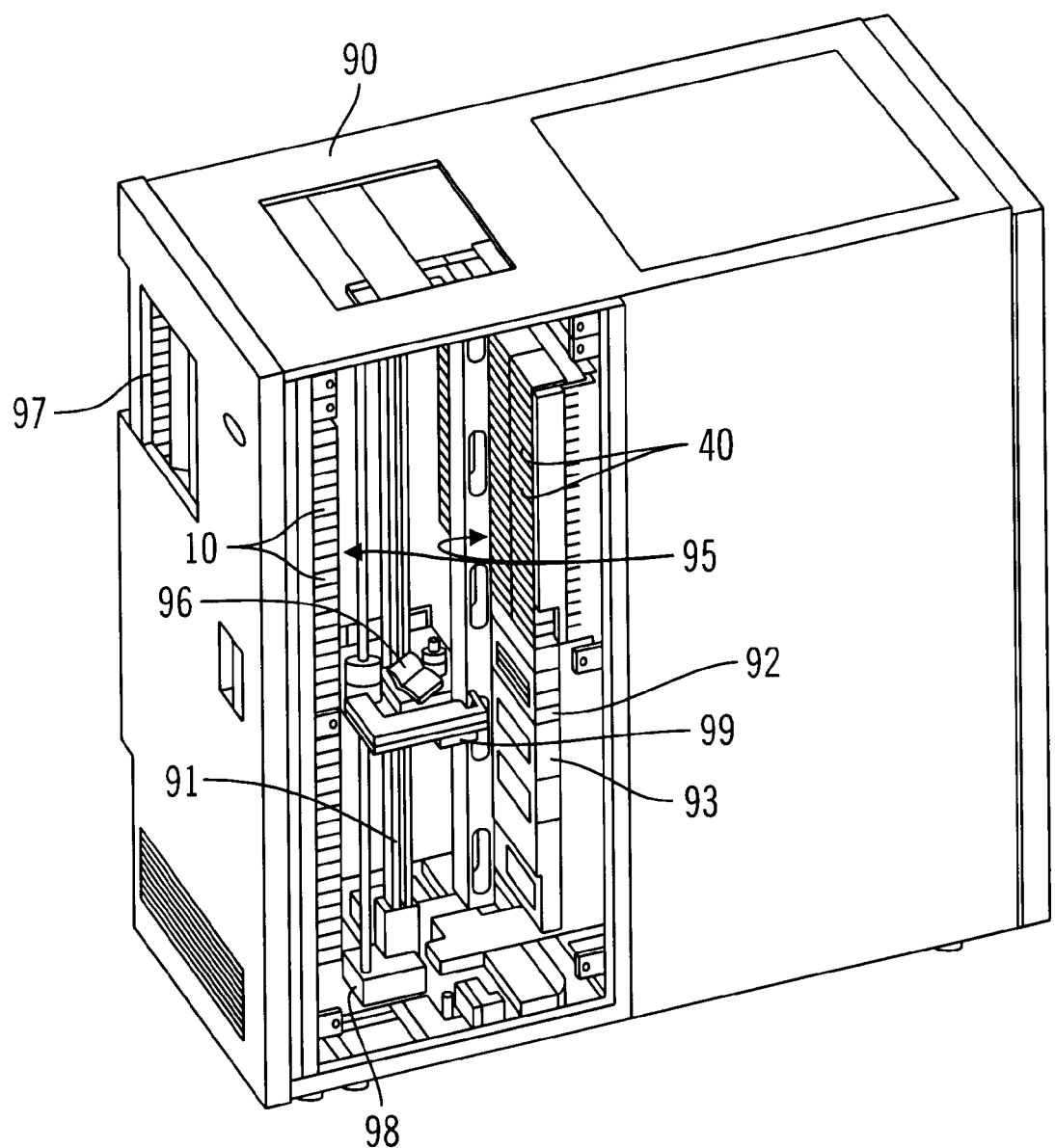
FIG. 10 is an isometric view of an automated data storage library for storing, transporting, and providing data transfer with respect to tape cartridges of FIG. 1 and portable data storage cartridges of FIG. 3.
Figure 11:
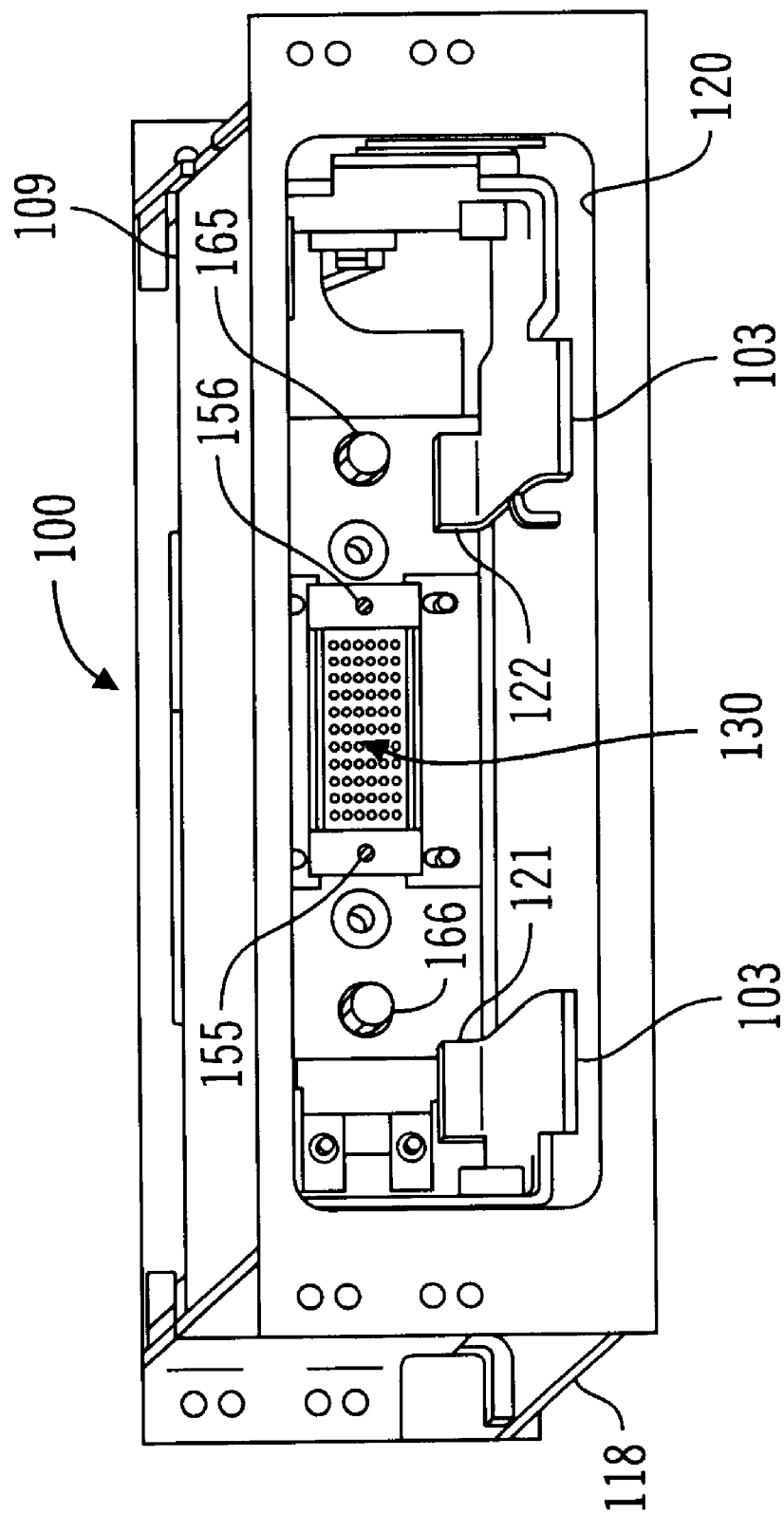
FIG. 11 is an isometric view of a transfer station for providing data transfer with respect to the portable data storage cartridge of FIG. 3 and for differentiating the portable data storage cartridge of FIG. 3 from a tape cartridge of FIG. 1.

FIG. 10 illustrates an automated data storage library 90 for storing, transporting, and providing data transfer with respect to tape cartridges 10 of FIG. 1 and portable data storage cartridges 40 of FIG. 3. The library 90 comprises at least one, and preferably a plurality of, data storage drives 92 for reading and/or writing data on data storage media, such as the tape cartridges 10. Additionally, the library comprises at least one, and preferably a plurality of, transfer stations 93 for providing data transfer with respect to the data storage cartridges 40. Both the tape cartridges 10 and the data storage cartridges 40 are stored in storage shelves 95. The various cartridges may be stored in a segregated manner or may be stored randomly throughout the storage shelves. A typical automated data storage library also comprises one or more input/output stations 97 at which a cartridge may be received or delivered. A robot accessor 98, including a gripper 99, grips and transports a selected cartridge 10 or 40 amongst a storage shelf 95, an input/output station 97, a transfer station 93 and/or a data storage drive 92. The automated data storage library robot accessor may also include a media sensor 96. The media sensor 96 may comprise a label reader, such as a bar code scanner, or a reading system, such as a smart card or RF (radio frequency) reader, or other similar type of system, which is able to identify the cartridge, such as by means of its volume serial number, or VOLSER. As one example, the VOLSER may comprise a label placed on the cartridge which is read by a bar code reader. As another example, the VOLSER may be in recorded in an RF chip in the cartridge which is read by an RF receiver.

FIGS. 11–22 illustrate an embodiment of a transfer station 100 and various components. The transfer station may be employed on a stand-alone basis, or may comprise a transfer station 93 of the automated data storage library 90 of FIG. 10.

In one aspect, referring to FIGS. 11–14, the transfer station 100 is arranged to provide data transfer with respect to portable data storage cartridges 40 of FIG. 3, where the portable data storage cartridge has generally an exterior dimensional form factor of a tape cartridge 10 of FIG. 1 having a leader block. As discussed above, the leader block comprises a hole 19 therethrough for engagement by a threading pin. Also as discussed above, the portable data storage cartridge 40 comprises a blocking portion, such as the blocking portion 42, of the cartridge shell 41, which is opaque.

The transfer station 100 comprises a receiver 103 for receiving the portable data storage cartridge. The cartridge may be received manually, or may be received from the robot accessor of the automated data storage library 90 of FIG. 10, or may be received from an automated cartridge loader (ACL) as is known to those of skill in the art.

Optical sources 105 and 106 are mounted at openings 107 and 108 of a top plate 109 of the transfer station. Sensors 115 and 116 are mounted on a printed circuit board (PCB) 118 for sensing the optical sources 105 and 106, respectively. The optical sources 105 and 106 preferably comprise an infrared source, such as an LED optical source, which is focused, providing a focused beam directed toward the respective sensor 115 and 116, which preferably comprise infrared optical sensors.

Optical source 105 and corresponding sensor 115 are located near a receiving slot 120 of the transfer station into which the cartridge is inserted. Thus, as the cartridge, whether it is a tape cartridge 10 or a portable data storage cartridge 40, the cartridge interrupts the beam, such that the sensor 115 detects that a cartridge is being inserted into the receiver 103. Stops 121 and 122 are provided at the end of travel of receiver 103, and comprise the point at which the cartridge is fully received into the transfer station.

Optical source 106 is located at, and directed toward the location of the leader block hole 19 of a tape cartridge 10 and the location of the blocking portion 42 of a portable data storage cartridge 40 when a cartridge is at the end of travel in the receiver. The corresponding sensor 116 is positioned at the location of the leader block hole and blocking portion at the opposite side of the cartridge from the optical source 116. The sensor 116 may be enabled by the sensor 115, and senses the blockage of the optical source 106 by a cartridge shell blocking portion, thereby identifying the differentiated identification of the data storage cartridge, and indicating the presence of the portable data storage cartridge 40 at the end of travel in the receiver 103. Sensor 116 will therefore enable the transfer station to load the portable data storage cartridge 40. If the beam is not blocked, such that sensor 116 continues to detect the beam from the optical source 106, either the cartridge has not been fully inserted into the receiver 103, or the cartridge is a tape cartridge 10, and the beam is received through the leader block hole 19. In this situation, there is an error, and the transfer station will not proceed.

As is understood by those of skill in the art, one or both source 105, 106 and corresponding sensor 115, 116 may be reversed, the source located on the PCB 118, and the sensor on the top plate 109. Also as is understood by those of skill in the art, alternative locations intermediate the PCB and on the top plate may also be employed for mounting the sources and sensors.

Referring to FIGS. 11 and 15–17, in another aspect, a data transfer interface 130 of the transfer station 100 is illustrated for mating with the external data transfer interface 48 of the portable data storage cartridge 40, of FIGS. 3–9. The transfer station 100 releasably, repeatably provides an electrical coupling with respect to the cartridge external data transfer interface, which comprises a substrate 71 having a plurality of substantially flat electrical contacts 51 on a substantially flat facing surface 50 thereof, the substrate mounted in a portable cartridge 40 capable of being engaged by a loader.

The data transfer interface 130 comprises an elastomeric compression element 132 having a plurality of protruding compression members 133 supported by a reference plate 134. Preferably, the compression element is cemented to the reference plate 134. The compression element is positioned at a rear surface 135 of a matching circuitized flexible substrate 136, which preferably comprises a termination of a flex cable 138. The matching circuitized flexible substrate 136 has substantially flat electrical contacts 141 on a facing surface 140 thereof, the electrical contacts 141 arranged to match the portable cartridge electrical contacts 51 when in a face-to-face relationship. The protruding compression members 133 of the compression element 132 are facing and in contact with the rear surface 135, such that the individual compression members 133 are registered with the corresponding individual electrical contacts 141.

The compression element 132 is generally of the type described in U.S. Pat. Nos. 4,902,234; 5,059,129; 5,873,740; or 5,947,750.

At least ones of the flat electrical contacts 141 of the matching circuitized flexible substrate 136 of flex cable 138, and corresponding ones of the flat electrical contacts 51 of the substantially flat substrate facing surface 50 of the flex cable 65 of FIG. 6, comprise elongated contacts, the contacts 141 each registering with two adjacent individual compression members 133 of the elastomeric compression element 132. In this manner, the elongated contacts have matching contact surfaces which are at least twice as great in surface area as a single contact of the size of a single compression member.

As with respect to the electrical contacts 51 of flex cable 65 of FIG. 6, the electrical contacts 141 of the substantially flat substrate facing surface 140 comprise gold pads, and preferably comprise copper pads on which are plated a diffusion barrier, such as nickel, and Type II, or "hard" gold pads plated on the diffusion barrier, but which are plated to a thickness greater than standard, for example, to a thickness of substantially 100 micro inches. The diffusion barrier is preferably plated to a thickness greater than 50 micro inches. Preferably, the gold pads are electrolytically plated.

Figure 14:
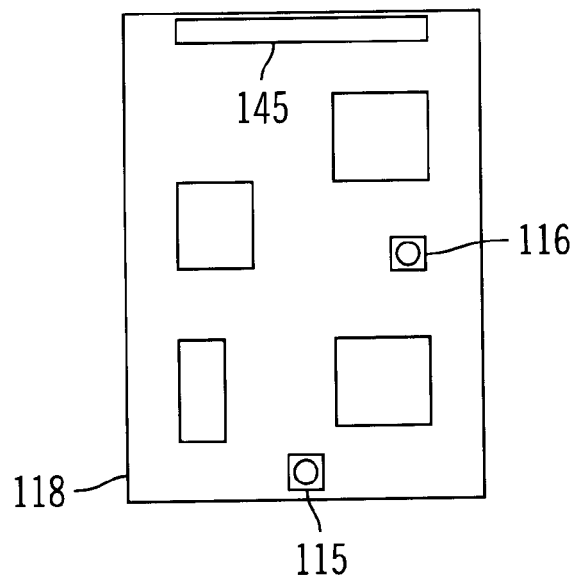
FIG. 14 is a plan view illustration of an example of a PCB mounting sensors for sensing the optical sources of FIGS. 13A and 13B.

The flex cable 138 comprises a plurality of lands coupled to the flat electrical contacts 141 of the facing surface 140 at the termination 136, and are coupled to the PCB 118 of FIG. 14 at connector 145 at termination 146 of the flex cable.

In another aspect, alignment, or registration, holes 155 and 156 are provided in close proximity to the flat electrical contacts 141. The flex cable termination 136 is aligned and the electrical contacts 141 registered with respect to the compression members 133 at the time of assembly by use of a probe inserted through holes 157 and 158 of the termination 136 and into holes 155 and 156, respectively, and the flex cable termination is tightened to a predetermined amount at the compression members. As will be discussed, the matching circuitized flexible substrate 136 is tightened only sufficiently to attain registration, while issuing from the elastomeric compression element 132 without an immediate change in direction, and subsequently forming a gradual curve 160, 161 in a direction normal to the facing surface 140. Then, clamps 162 and 163 are bolted into place to hold the circuitized flexible substrate in place. In the illustrated example, clamp 162 holds the flex cable at tail 164, and clamp 163 holds the flex cable 138. As will be discussed, when the external interface of the portable data storage cartridge is registered with the matching circuitized flexible substrate electrical contacts 141, a loader exerts a force on the portable cartridge normal to the facing surface 140, compressing the elastomeric compression element 132 between the matching circuitized flexible substrate 136 and the reference plate 134. The arrangement of the matching circuitized flexible substrate 136 to issue from the elastomeric compression element 132 without an immediate change in direction and subsequently form the gradual curve 160, 161 in a direction normal to the facing surface 140, allows the substrate to move freely in the normal direction without pulling in the lateral direction. This creates a non-wiping contact between the electrical contacts 51 of the portable cartridge substrate 50 of FIG. 3 and the electrical contacts 141 of the matching circuitized flexible substrate 136, thereby forming a releasable, repeatable electrical connection therebetween.

Figure 19:
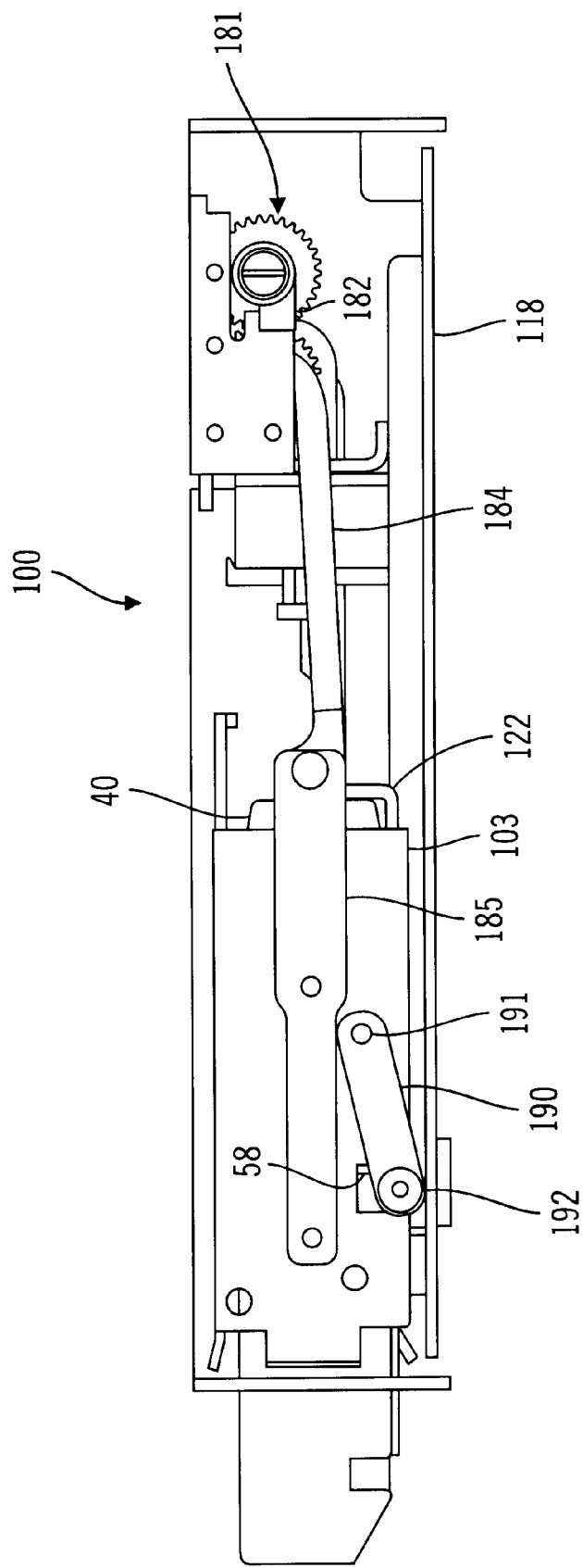
FIG. 19 is a side view cut away illustration of the transfer station of FIG. 11 illustrating the loading mechanism in an unloaded position.

In another aspect, referring additionally to FIG. 19, the transfer station 100 additionally comprises alignment pins 165 and 166 for mating with respective registration holes 55 and 56 of the portable data storage cartridge 40 of FIG. 3 to register the external data transfer interface 48 with the station data transfer interface 130. Both alignment pins are aligned substantially normal to the facing surface 140 of the matching circuitized flexible substrate 136, and are tapered at the ends 167 and 168, respectively, to a rounded point in the direction of the portable cartridge substrate 50 to orient the portable cartridge substrate and gradually laterally align the portable cartridge substrate and the matching circuitized flexible substrate 136. To prevent tolerance buildup between the alignment pins and the respective registration holes, alignment pin 165 is preferably cylindrical, the same as the corresponding registration hole 55, and of a slightly lesser diameter. As an example, the alignment pin may have a diameter 5% less than that of the registration hole. However, alignment pin 166 is instead a non-round pin, such as a "diamond" pin, as is known to those of skill in the art, and is substantially narrower than pin 165, but of the same height. Thus, the external interface 48 of the portable data storage cartridge 40 is properly registered in the vertical direction at both ends by the alignment pins and is properly registered in the horizontal direction by the alignment pin 165.

Figure 17:
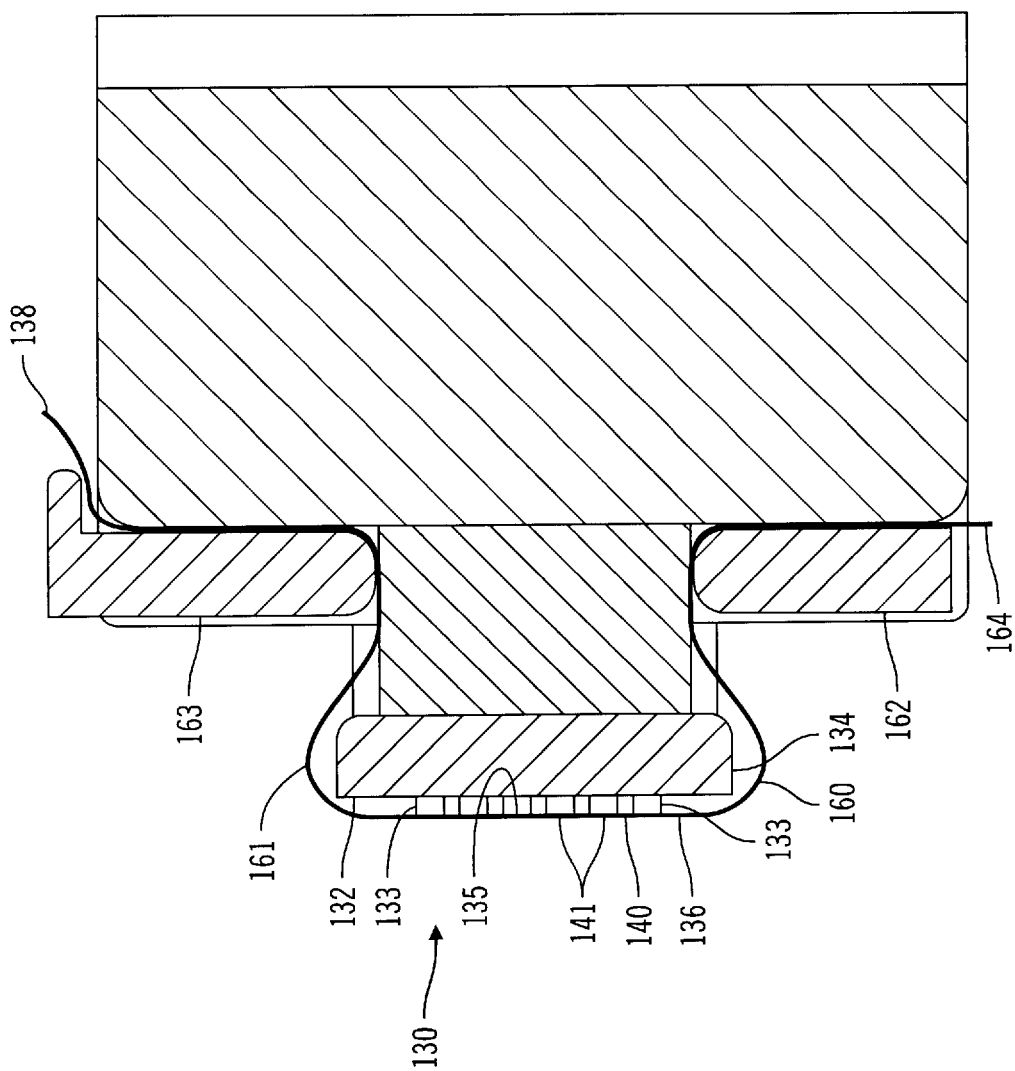
FIG. 17 is a cross section illustration of compression member, reference plate, support member and clamps of FIG. 15, with the flex cable of FIG. 16.

In another aspect, referring to FIG. 17, the facing surface 140 of the matching circuitized flexible substrate is oriented parallel to gravity, and the cartridge loader is oriented to provide the "normal" force orthogonal to gravity, to minimize debris deposition on the facing surface 140.

Figure 18:
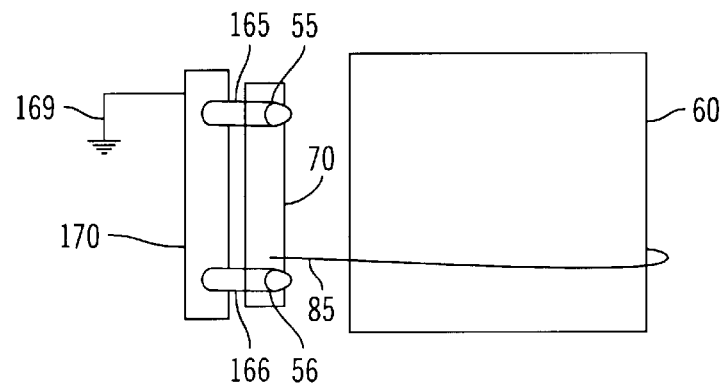
FIG. 18 is a circuit diagram illustrating an electrostatic discharge (ESD) path of the transfer station of FIG. 11 and of a portable data storage cartridge of FIG. 3.

In another aspect, and additionally referring to FIG. 18, when registered and aligned with the transfer station, the backing plate 70 of the portable data storage cartridge 40 of FIGS. 8 and 9 is in contact with the alignment pins 165 and 166 at registration holes 55 and/or 56. As discussed above, the backing plate 70, and therefore the registration holes 55 and 56 are electrically coupled to the data storage device, such as magnetic data storage drive 60, by means of land 85 of the flex cable, to a ground thereof, thereby forming an electrostatic discharge path from the data storage device to the backing plate and through the electrically semiconductive material to the alignment pins. The data storage device, since it is within a portable data storage cartridge, is not externally grounded and, as such, comprises an electrostatic source in the cartridge. The alignment pins 165 and 166 are conductive and coupled to a ground path 169, via support member 170, thereby forming an electrostatic discharge path from the registration holes 55 and 56 of the portable data storage cartridge 40 to the ground path 169.

Figure 12:
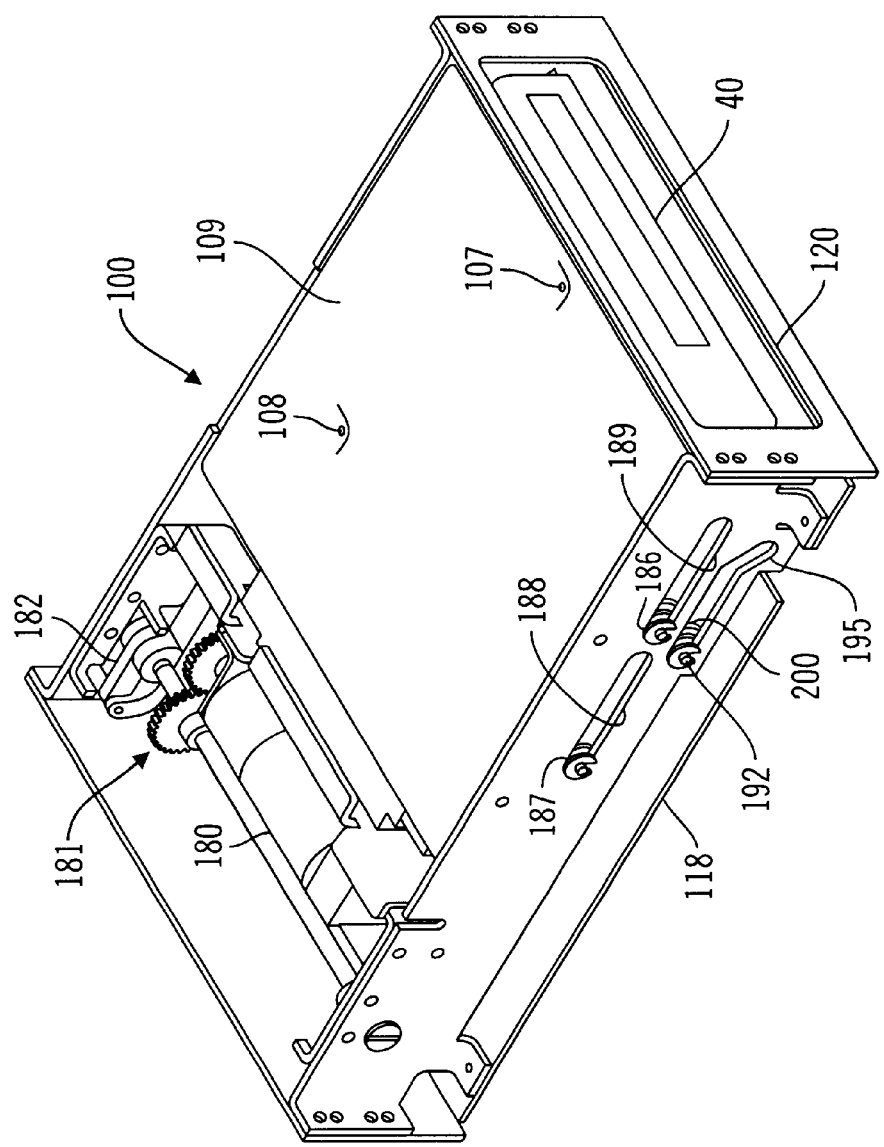
FIG. 12 is an alternative isometric view of the transfer station of FIG. 11, with a loaded portable data storage cartridge of FIG. 3.
Figure 13A:
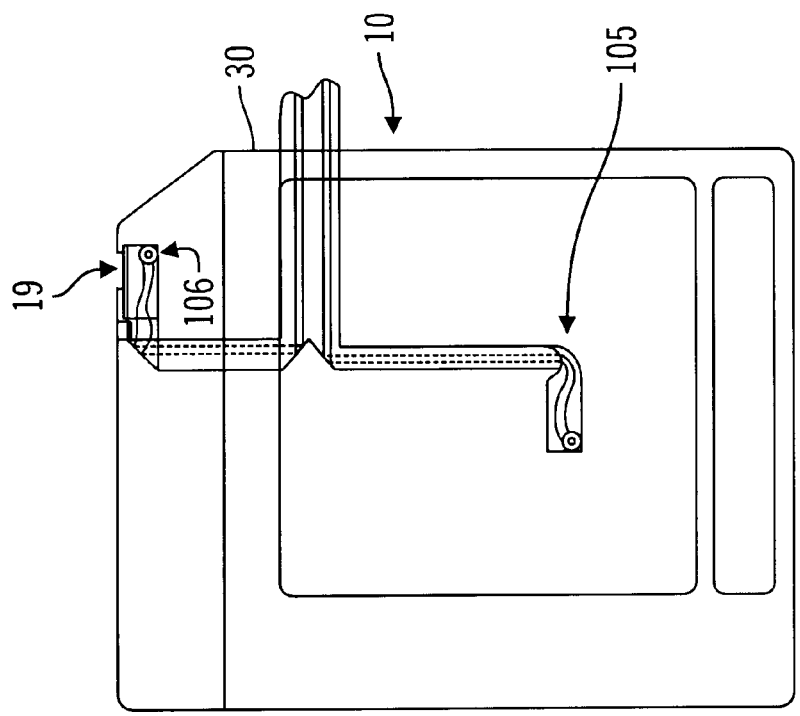
FIGS. 13A and 13B are top view illustrations of an optical source mounted on a top plate of the transfer station of FIG. 12 for detecting, respectively, the portable data storage cartridge of FIG. 3 and the tape cartridge of FIG. 1.
Figure 13B:
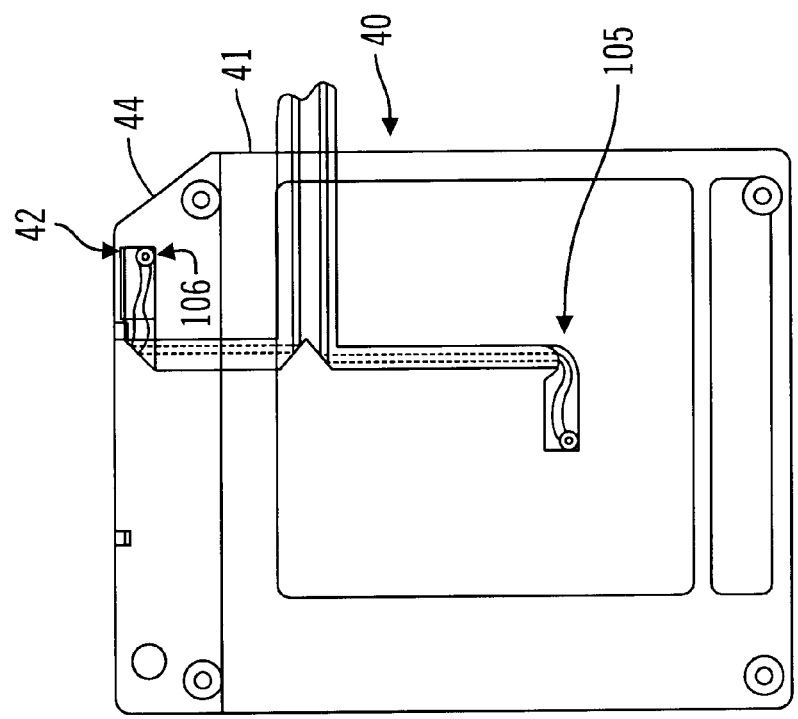
Figure 20:
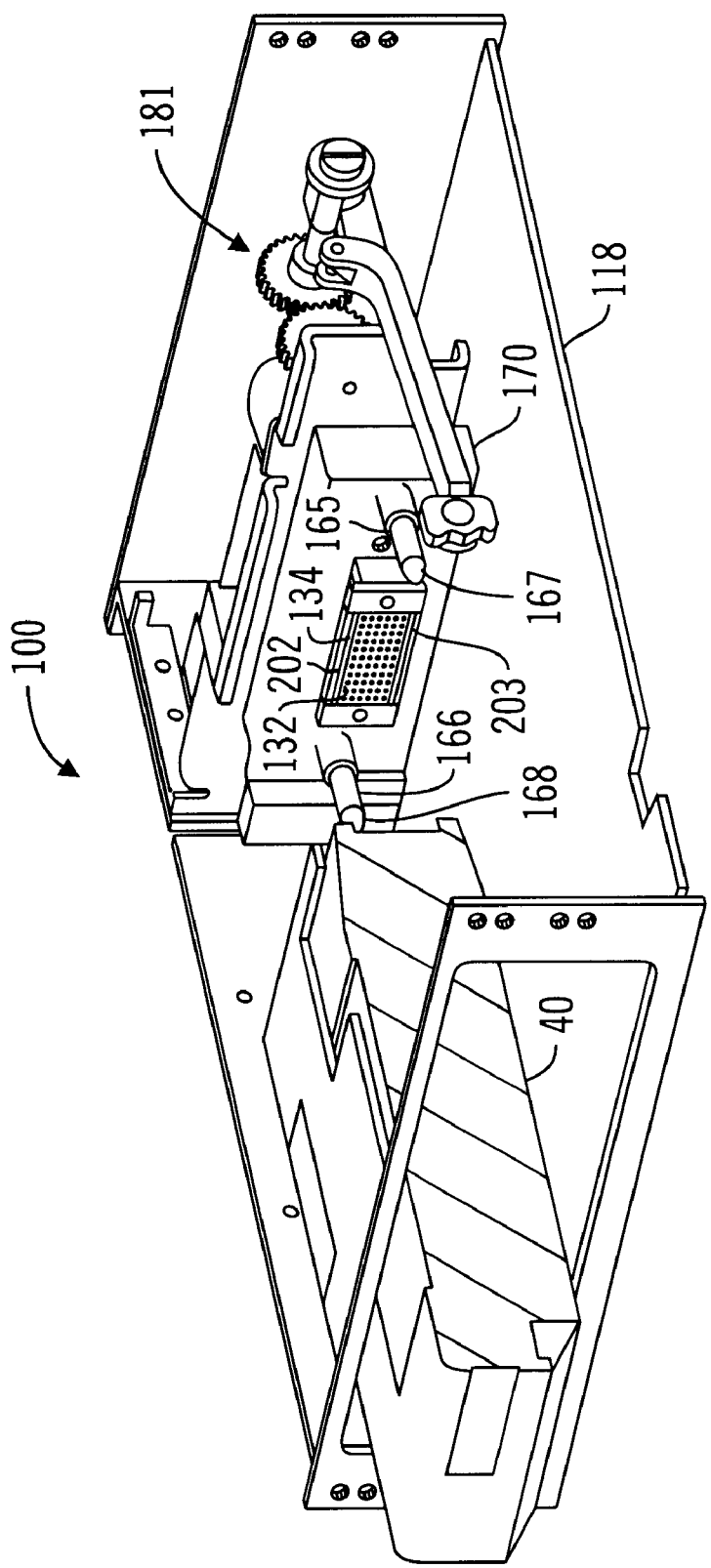
FIG. 20 is a cut away illustration of the transfer station of FIG. 11 and of a portable data storage cartridge of FIG. 3 with the loading mechanism in an unloaded position.
Figure 21:
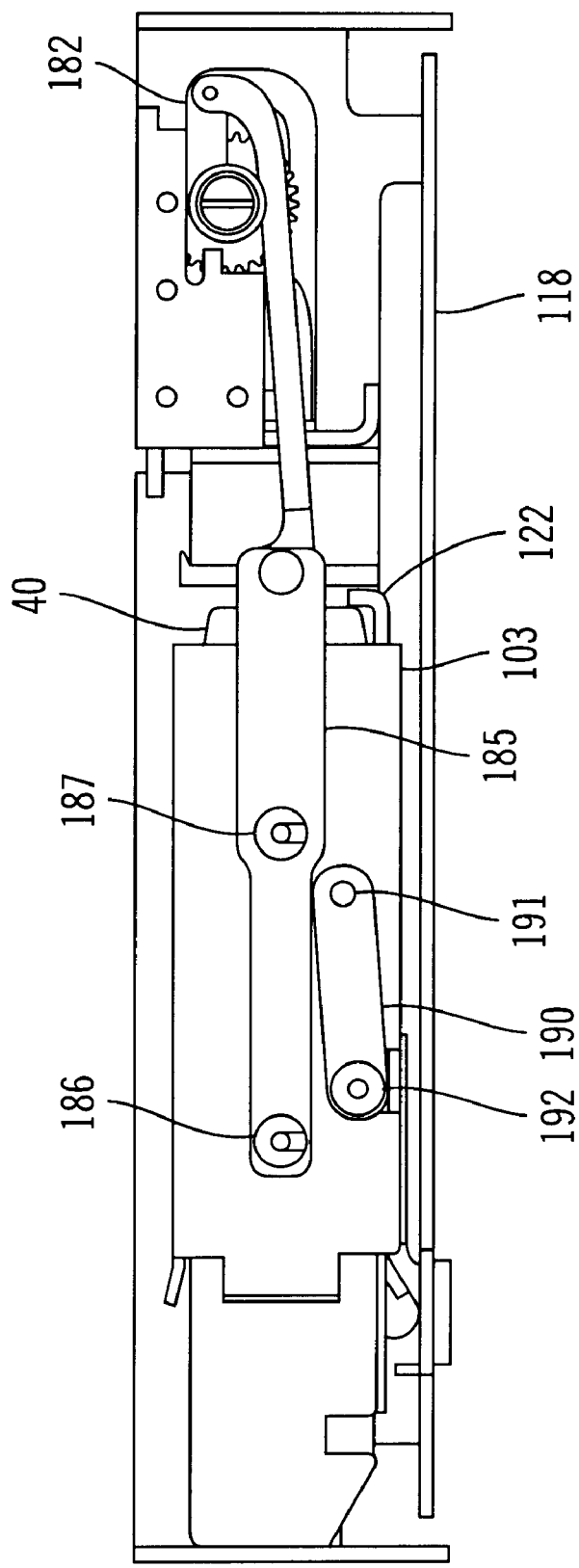
FIG. 21 is a side view cut away illustration of the transfer station of FIG. 11 illustrating he loading mechanism in a loaded position.
Figure 22:
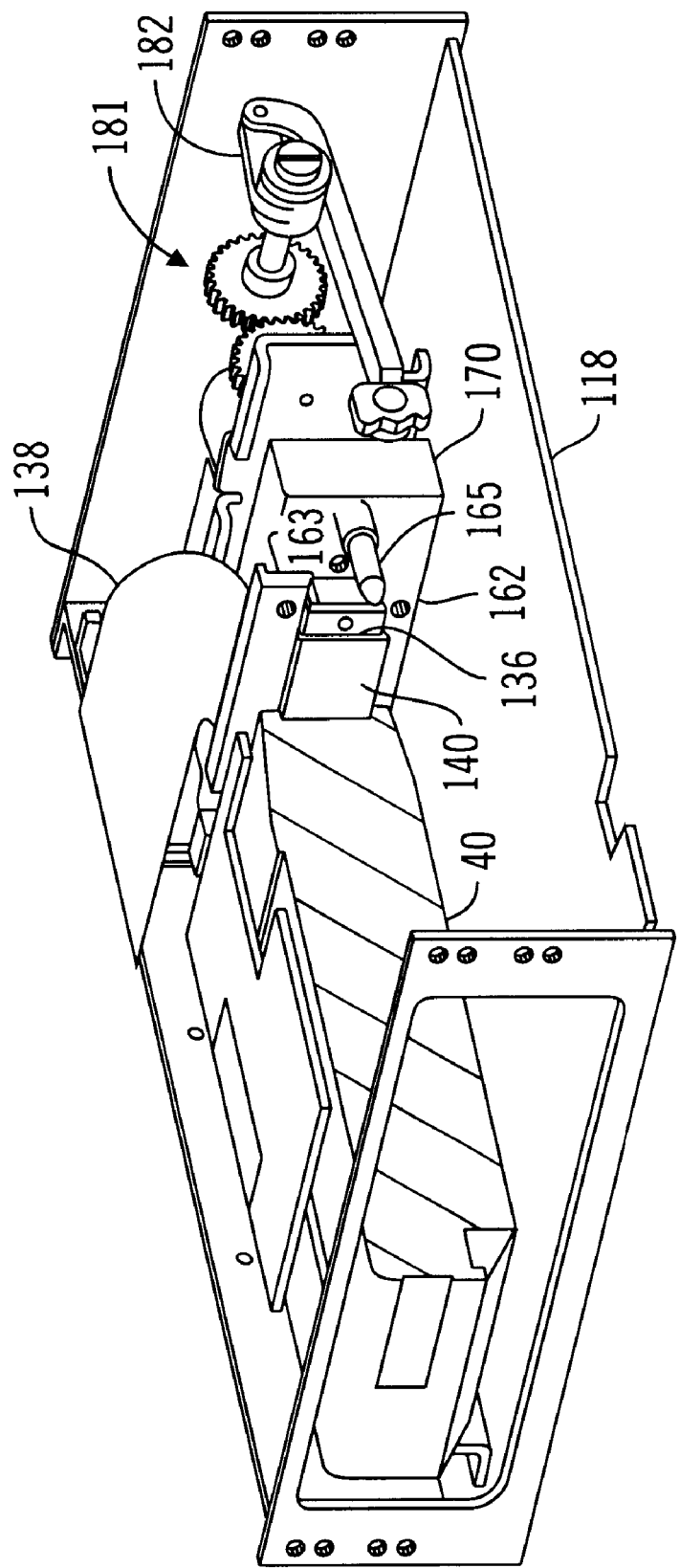
FIG. 22 is a cut away illustration of the transfer station of FIG. 11 and of a portable data storage cartridge of FIG. 3 with the loading mechanism in a loaded position.

Referring to FIGS. 12 and 19–22, a loader of the transfer station 100 is illustrated which loads the portable data storage cartridge, exerting a force normal to the facing surface 140 of the flex cable 138 of FIG. 17. FIGS. 19 and 20 illustrate a cartridge 40 at the end of travel in the receiver 103 at the stops (only stop 122 is shown), and before the cartridge is loaded. FIGS. 12, 21 and 22 illustrate a cartridge that has been loaded. FIG. 22 also illustrates the flex cable 138 as arranged to loop over and outside the mechanism of the transfer station 100 to the PCB 118, thereby both allowing ease of assembly and of replacement of both the PCB and the flex cable.

The loading mechanism is initially at an "insert" position with motor 180 having operated through gear train 181 to rotate arm 182 toward the front of the transfer station 100. Arm 182 has thus pushed beam 184 toward the front of the transfer station, which pushed arm 185 of receiver 103, and therefore the receiver 103 towards the front opening 120 of the transfer station. Guides 186 and 187 of the arm 185 ride in slots 186 and 187 of the transfer station and movably support the receiver 103 as it moves forward and backwards. An engagement arm 190 is attached to the receiver 103 at pivot 191, and includes a guide 192 which moves in slot 195 of the transfer station. As is understood by those of skill in the art, the guides, arms, beams and slots are the same on each side of the receiver 103. Also as is understood by those of skill in the art, differing arrangements of guides, arms, beams and slots may be employed in accordance with the present invention.

When the receiver 103 is in the "insert" position toward the front opening 120 of the transfer station, slot 195 pulls guide 192 down, away from the receiver 103. An engagement pin 200 is located on the same shaft as guide 192, on the opposite side of arm 190, and protrudes toward the interior of the receiver 103. Thus, as the guide 192 is pulled down by slot 195, the engagement pin 200 is also pulled down, out of the interior of the receiver 103. This allows a portable data storage cartridge to be inserted into the receiver.

The loader is enabled by the sensor 116 of FIG. 14, which, as discussed above, identifies the differentiated identification of the data storage cartridge, indicating the presence of the portable data storage cartridge 40 at the end of travel in the receiver 103.

The sensor 116 enables motor 180 to operate through gear train 181 to rotate arm 182 away from the front, and toward the rear, of the transfer station 100. Arm 182 thus pulls beam 184 toward the rear of the transfer station, which pulls arm 185 of receiver 103, and therefore the receiver 103, towards the rear of the transfer station. As the receiver 103 is pulled toward the rear of the transfer station, slot 195 elevates guide 192 up, toward the receiver 103, such that engagement pin 200 is elevated into the receiver 103, where it engages the portable cartridge 40 of FIG. 3 at notches 58 and 59. As the receiver continues to be pulled forward, the engagement pins 200 exert a force on the portable cartridge 40 normal to the facing surface 140 of the matching circuitized flexible substrate 136. First, the alignment pins 165 and 166 engage corresponding holes 55 and 56 of the cartridge to orient the portable cartridge substrate and gradually laterally align the portable cartridge substrate and the matching circuitized flexible substrate 136, registering the cartridge substrate electrical contacts 51 in face-to-face relation with the matching circuitized flexible substrate electrical contacts 141. Then the alignment pins exert the normal force on the portable cartridge and cause the portable cartridge substrate 50 (and backing plate 70) to compress the elastomeric compression element 132 between the matching circuitized flexible substrate 136 and reference plate 134 to create non-wiping contact between the electrical contacts 51 of the portable cartridge substrate 50 and the electrical contacts 141 of the matching circuitized flexible substrate 136, thereby forming a releasable, repeatable electrical connection therebetween.

As an example, the force generated by the loader may comprise at least 30 grams per compression member, for a total normal force greater than 10 pounds on the cartridge, and compresses the compression element a depth of about 0.022 inches. In loading the cartridge, the motor 180 rotates arm 182 beyond the center of rotation to a stop, so that the arm tends to be locked in position to prevent inadvertent release of the cartridge. The motor releases the cartridge by rotating back over center and then towards the front opening 120 of the transfer station.

Figure 15:
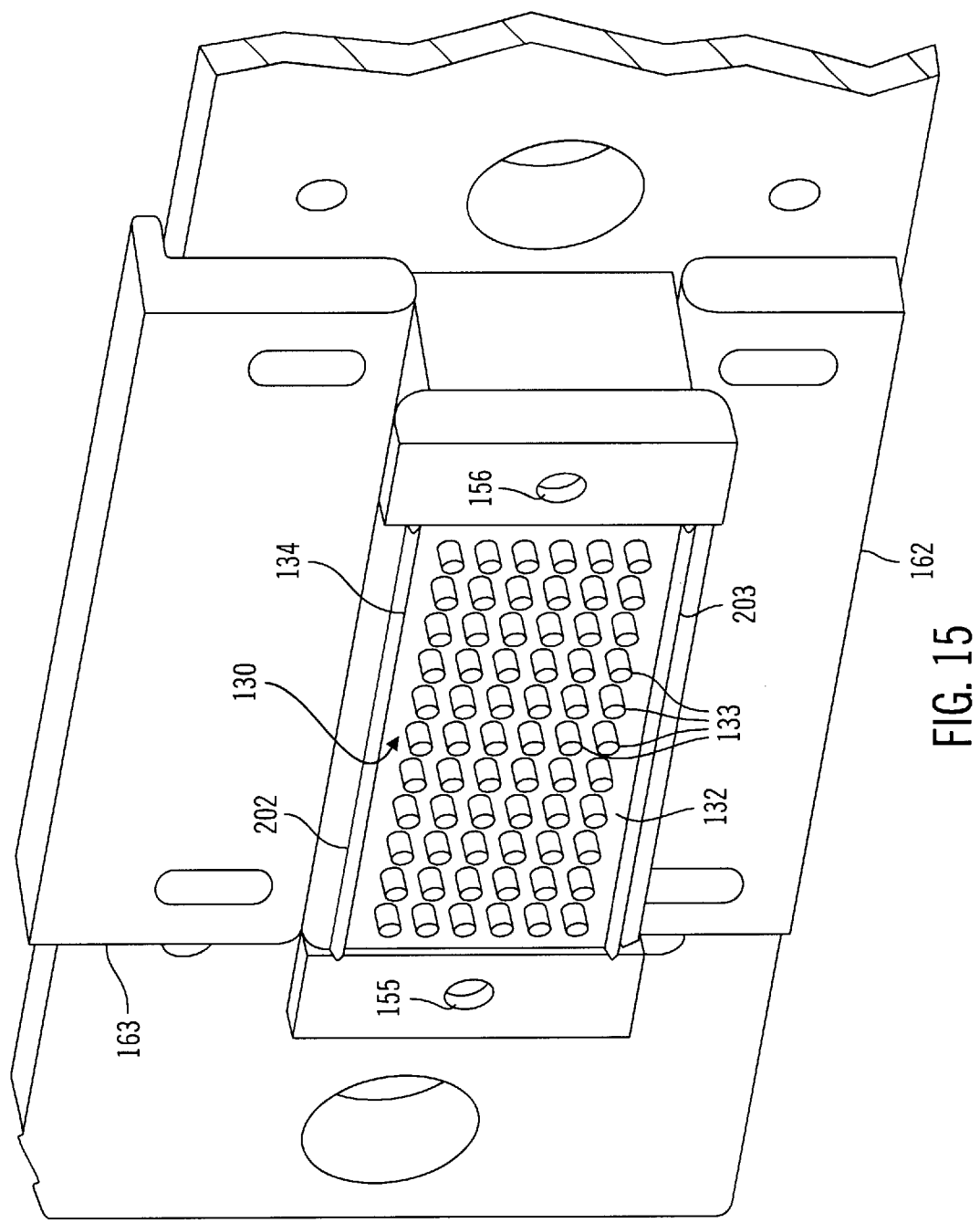
FIG. 15 is an isometric illustration of a compression member, reference plate, support member and clamps of the transfer station of FIG. 11.
Figure 16:
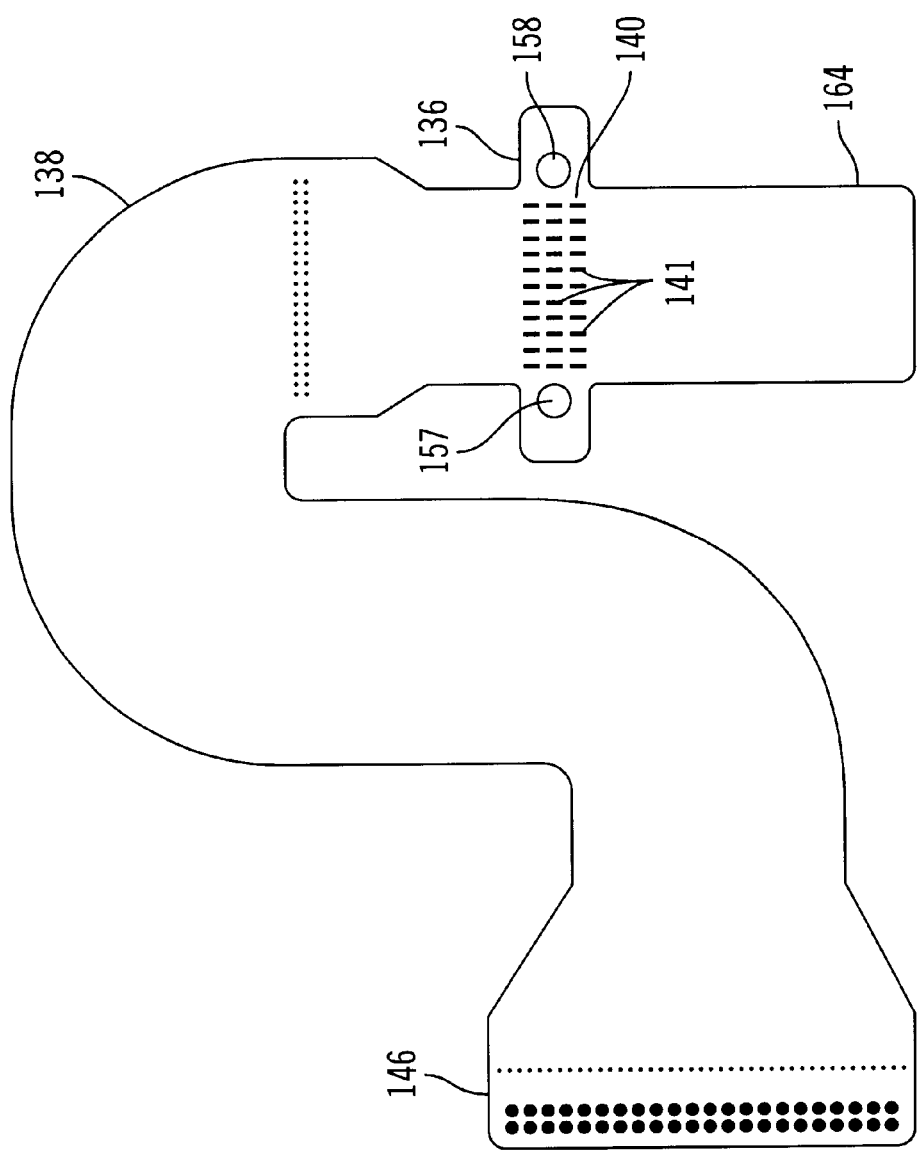
FIG. 16 is a plan view illustration of a flex cable of the transfer station of FIG. 11.

Referring to FIGS. 15 and 20, ribs 202 and 203 are provided at the edges of the compression element 132 to limit the compression of the compression members as the motor 180 of FIG. 12 rotates arm 182 to the loaded position.

Figure 23:
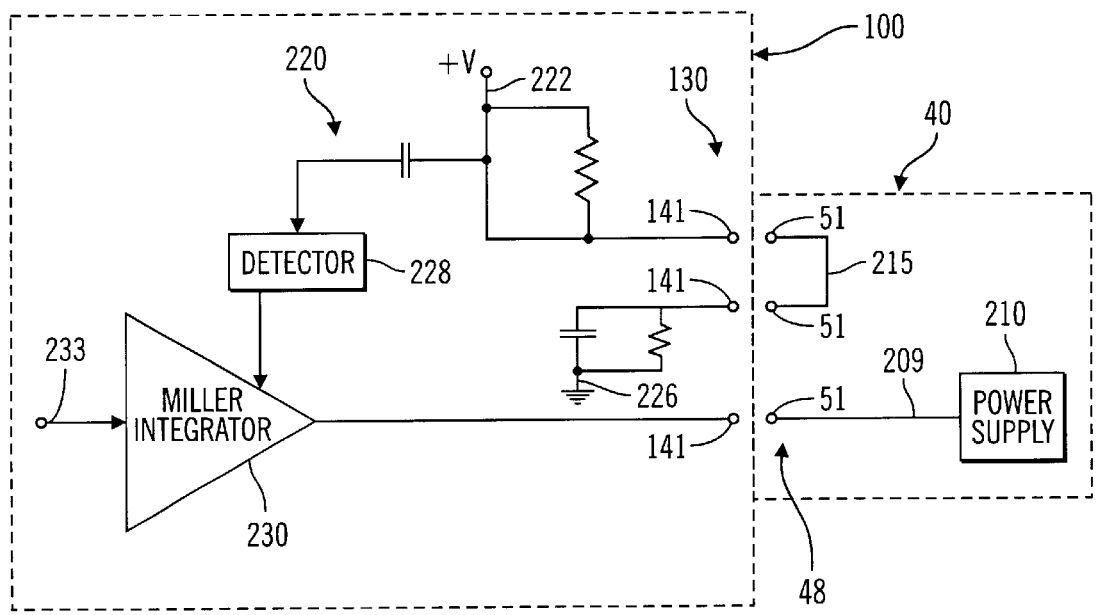
FIG. 23 is a circuit diagram illustrating a power transfer interface of the transfer station of FIG. 11 and of a portable data storage cartridge of FIG. 3.

In another aspect, additionally referring to FIG. 23, the external data transfer interface 48 of the portable data storage cartridge 40, in addition to coupling with the data handling agent, or data storage device, such as magnetic data storage drive 60, to provide data transfer with the contacted transfer station 100, comprises a power transfer interface coupled to by one or more lands 209 of the flex cable to a power element 210 of the data handling agent to transfer power from the transfer station 100 to the power element.

In a further aspect, the power transfer interface additionally comprises a closed loop 215 between two of the electrical contacts 51 to allow verification of electrical contact between the data storage device and the transfer station. The closed loop may be at a point along the flex cable, or at the data storage device. If the data storage device is an "off the shelf" device, which is preferable, the modification of the flex cable to provide the closed loop 215 is more appropriate.

The data transfer interface 130 of the transfer station 100 additionally comprises a station power transfer interface for transferring power from the transfer station to the power transfer interface 48 of the data storage cartridge.

An electrical contact verification sensor 220 is provided in the transfer station 100 for initially supplying a voltage from input 222 at the power transfer interface 48 of the data storage cartridge 40 to the closed loop 215, via contacts 141 and 51, and back to ground 226. The presence of a current from the voltage input 222, through the cartridge closed loop 215, and back to ground 226, in an indication that electrical contact has been made between the data storage cartridge and the station power transfer interface. Thus, detector 228 responds to a current through the closed loop, verifying electrical contact between the data storage cartridge and the station power transfer interface.

The transfer station power transfer interface additionally comprises a Miller integrator 230. The detector 228 of the electrical contact verification sensor 220 provides a signal indicating verification of electrical contact to the Miller integrator 230. Upon receiving the signal, the Miller integrator thereupon gradually ramps the application of power from an input 233 to the power transfer interface 48 of the data storage cartridge 40. The electrical contact verification and the Miller integrator insure that the active data handling element or data storage device in the cartridge 40 is protected from electrical spikes which could otherwise damage the device.

Figure 24:
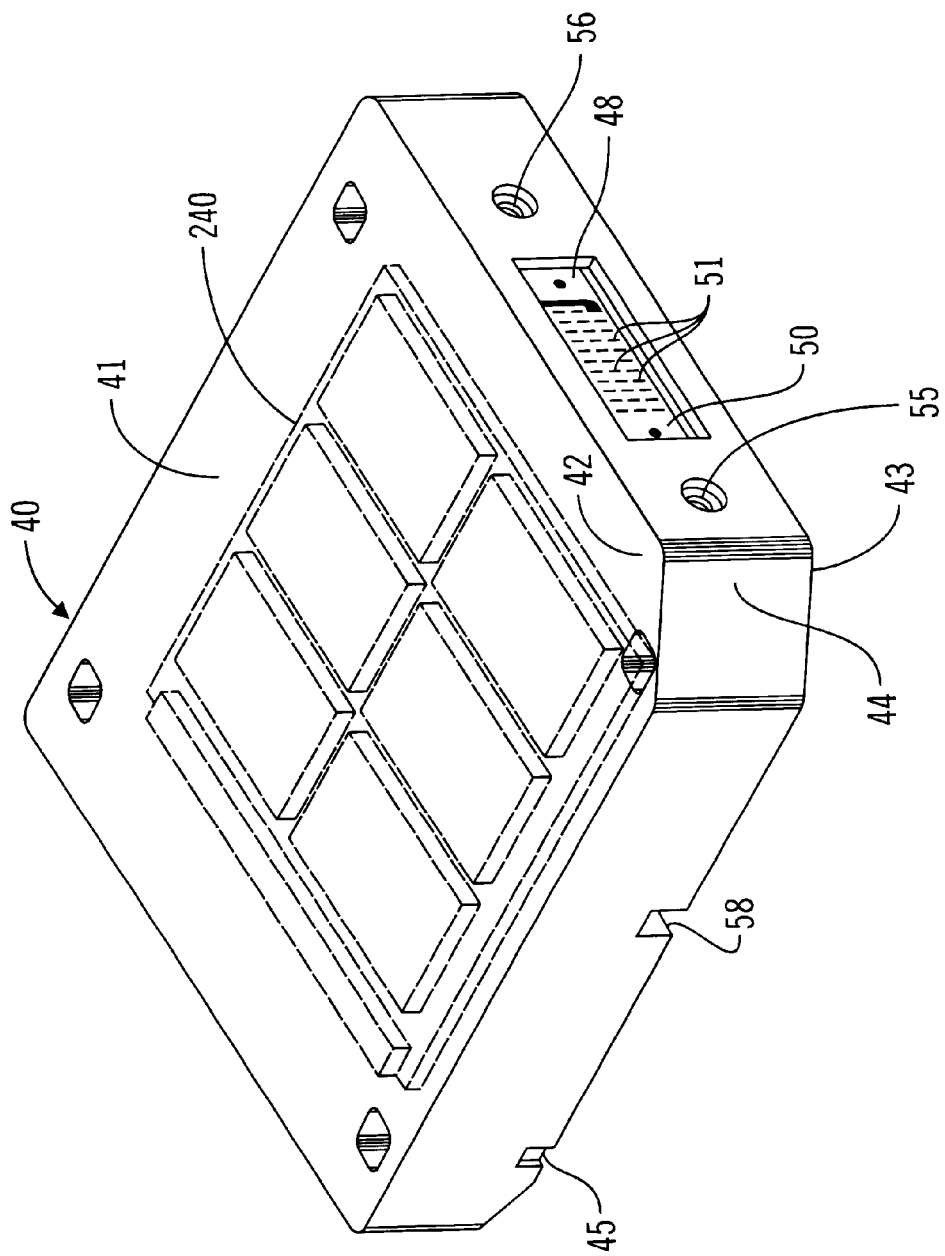
FIG. 24 is a diagrammatic illustration of a portable data storage cartridge of FIG. 3 containing a non-volatile solid state memory assembly.
Figure 25:
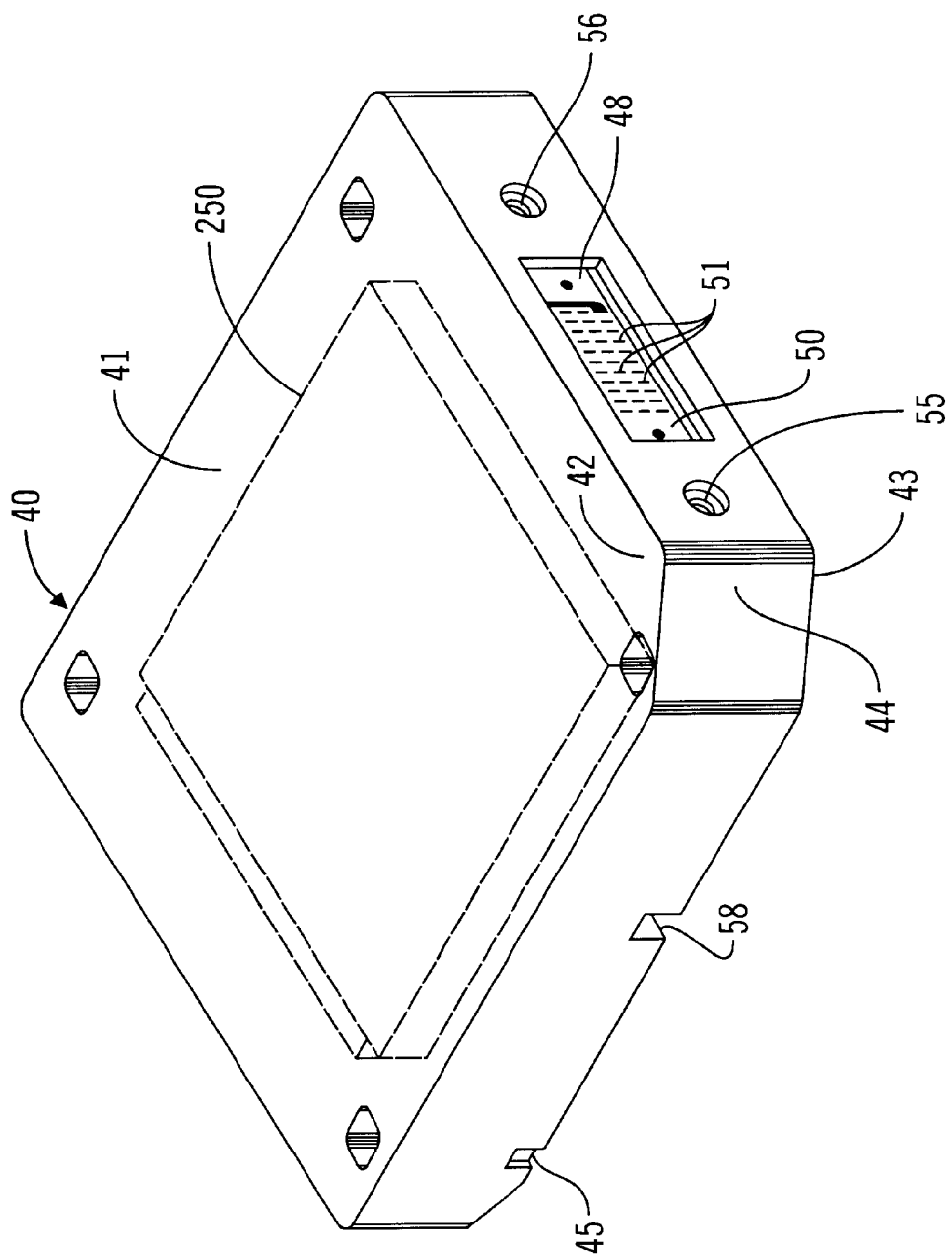
FIG. 25 is a diagrammatic illustration of a portable data storage cartridge of FIG. 3 containing an optical disk drive assembly.

FIGS. 24 and 25 illustrate portable data storage cartridges containing alternative data handling or data storage devices. FIG. 24 illustrates a portable data storage cartridge 40 of FIG. 3 containing a non-volatile solid state memory assembly 240. The solid state memory assembly may advantageously comprise an "off the shelf" device, such as are readily available. FIG. 25 illustrates a portable data storage cartridge of FIG. 3 containing an optical disk drive assembly 250. Currently, commercially available optical disk drives would have to be modified to employ a non-removable optical disk. Other data handling devices may occur to those of skill in the art.

Gripper Assembly Including Data and Power Interface

FIG. 10 illustrated an automated data storage library 90 including a gripper 99 that grips and transports a selected cartridge from one location, such as the storage shelf 95, input output station 97, transfer station 93, and/or a data storage drive 92 to another location in the library 90.

Figure 26:
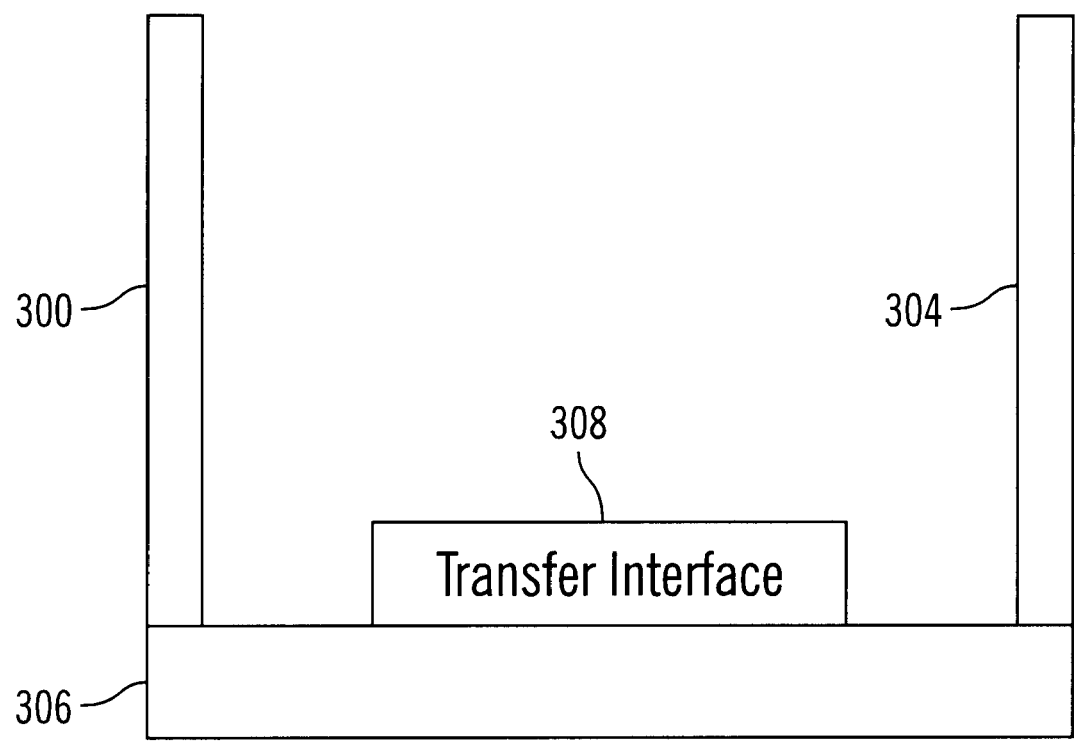
FIG. 26 illustrates an implementation of a gripper assembly.

FIG. 26 illustrates a gripper 299, which may comprise the gripper 99 in the library 90 (FIG. 10). The gripper 299 includes a gripper pair 300, 304 to engage the portable data storage cartridge 40 as illustrated in FIGS. 24 and 25. The gripper 299 further includes a backplane 306 and a transfer interface 308. In certain implementations, the transfer interface 308 may comprise the same structure and arrangement as the data transfer interface 130 described with respect to FIGS. 11 and 15–17, including a flex cable to provide the electrical contact. With such an arrangement, the gripper 299 would be able to supply power and transfer data with respect to a data storage cartridge 40 in the same manner as the data transfer interface 130 to mate with the external data transfer interface 48 of the portable data storage cartridge 40 (FIGS. 3–9). The gripper 299 transfer interface 308 may further include additional components described with respect to the transfer station 100, such as the transfer station power transfer interface described with respect to FIG. 23 to transfer power from the gripper assembly 299 to the power transfer interface 48 (FIGS. 3–9, 24, and 25) of the data storage cartridge 40.

The gripper assembly 299 would further include servo-electronics (not shown) to move along a track 91 (FIG. 10) in the vertical direction and a robot accessor 98 to move in the horizontal direction in the automated tape library 10 to access data storage cartridges 40 in the storage shelves 95 and transfer stations 93.

Figure 27:
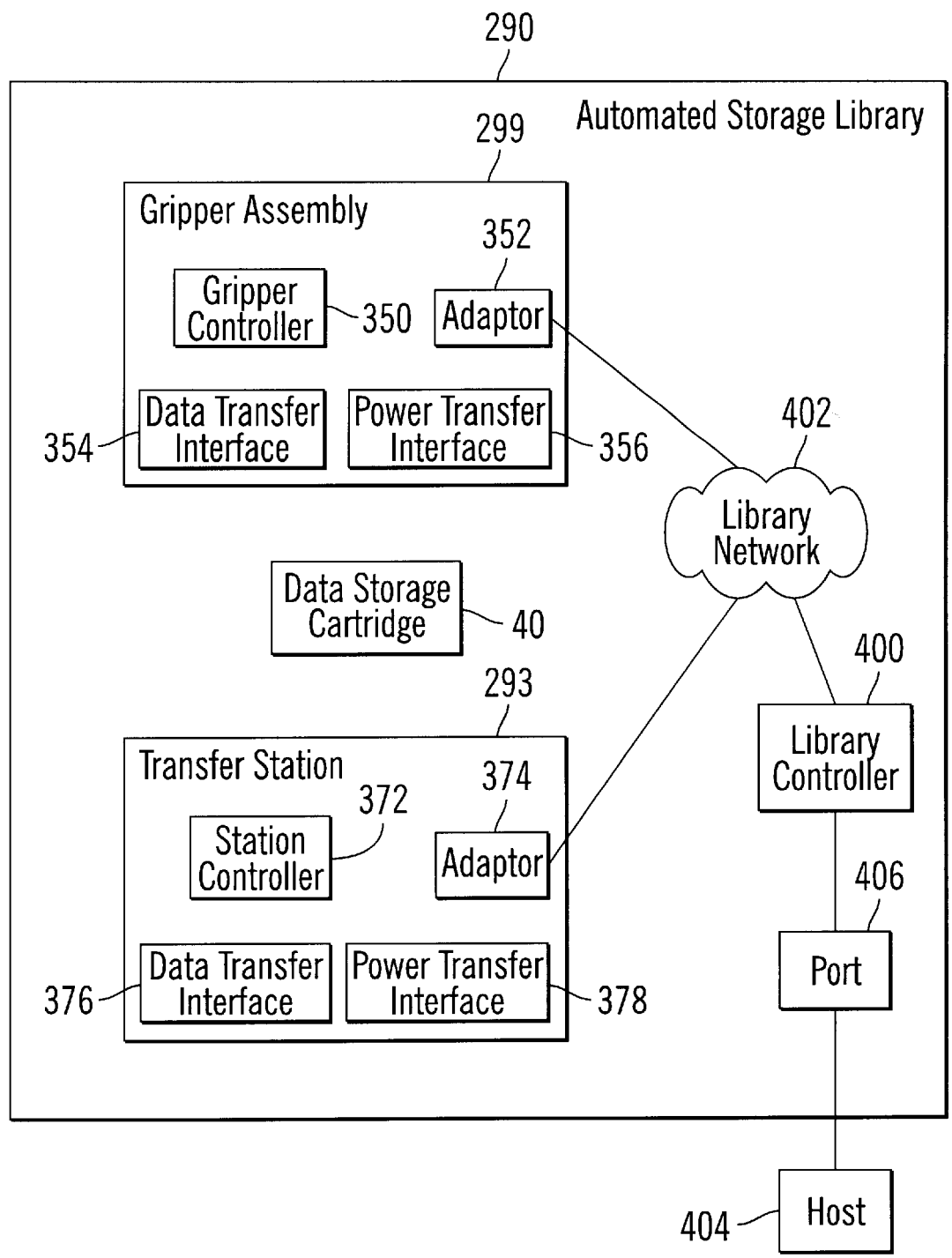
FIG. 27 illustrates an implementation of the components in the automated library of FIG. 10.

FIG. 27 illustrates one implementation of an automated storage library 290, that may include the components of the library 90 shown in FIG. 10. In this implementation, the gripper assembly 299 includes a gripper controller 350, network adaptor 352, data transfer interface 354, and power transfer interface 356. The gripper controller 350 may comprise a processor and microcode or hardware logic, such as an Application Specific Integrated Circuit (ASIC). The data transfer interface 354 and power transfer interface 356 may comprise the data transfer interface and power transfer interface described above with respect to the transfer station 100 in FIGS. 11–22. The gripper assembly 299, operating under control of the controller 350, is capable of engaging and moving the data storage cartridge 40, such as shown in FIGS. 24 and 25. The transfer station 293 includes a station controller 372, adaptor 374, and data 376 and power 378 transfer interface such as described with respect to transfer stations 93 and 100 in FIGS. 11–22. A library controller 400 would comprise the managing processing unit of the storage library 290 that manages Input/Output (I/O) requests received from an external host 404. The library 290 further includes a port 406 for interfacing with external devices, such as the host 404.

Adaptors 352 and 374, including an adaptor (not shown) in the library controller 400, enable communication with a library network 402, which may comprise any network or communication bus for enabling communication among the automated storage library 290 nodes or components, such as a Storage Area Network (SAN), controller area network (CAN), etc. In a Fibre Channel implementation, the gripper assembly 299, transfer station 293, library controller 400, and host 404 may all be connected on a Fibre Channel arbitrated loop to allow direct communication therebetween. In such case, the gripper assembly 299 and transfer station 293 could communicate directly with the host 404.

Figures 28, 29:
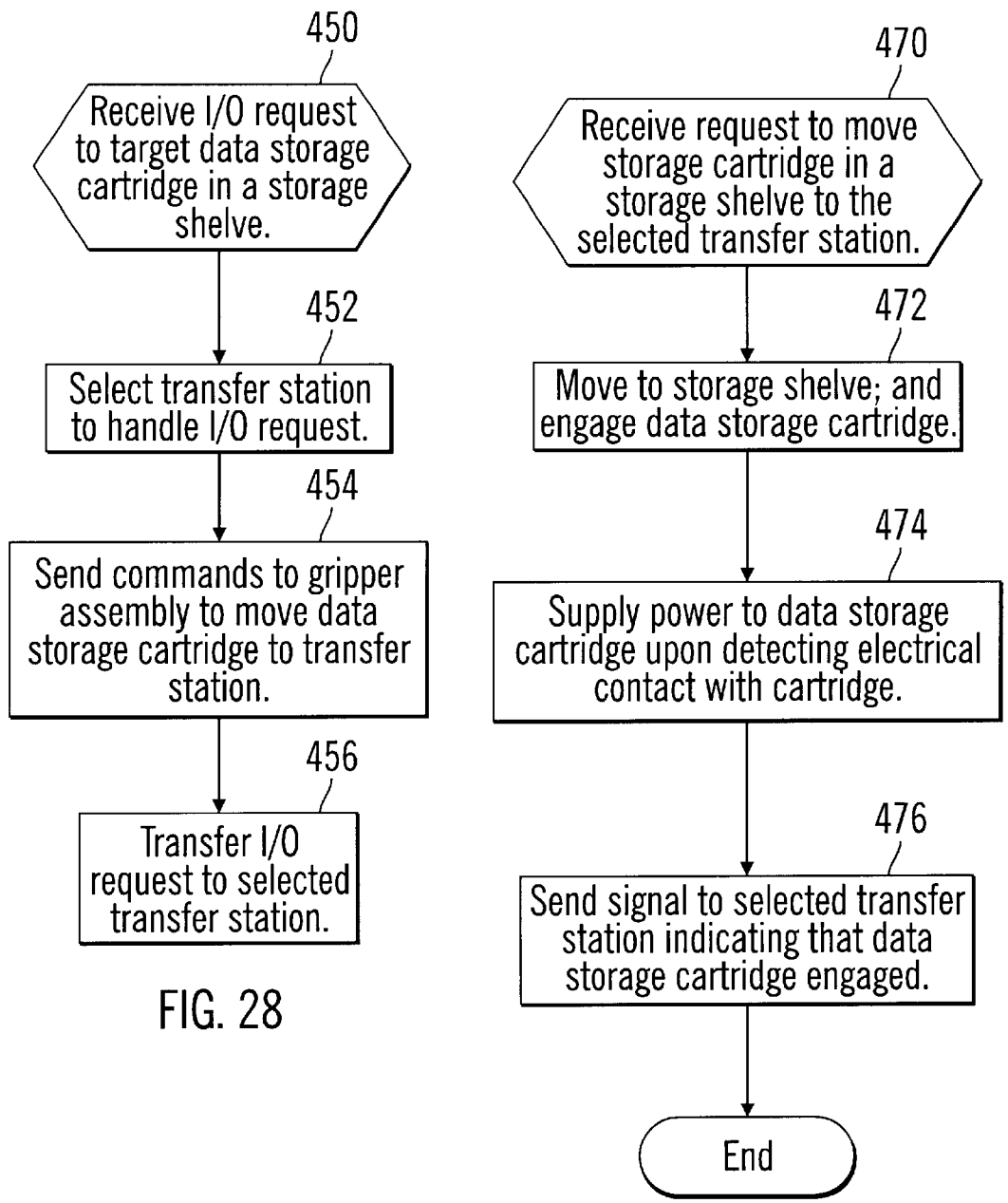

FIG. 28 illustrates logic implemented in the library controller 400 to manage I/O requests received from the host 404. Control begins at block 450 upon receiving an I/O request toward a target data storage cartridge 40 in a storage shelve (not shown) of the storage library 290, such as storage shelves 95 shown in FIG. 10. In response, the library controller 400 selects (at block 452) an available transfer station 293 to handle the I/O request. The library controller 340 sends (at block 454) commands to the gripper assembly 299 to move the target data storage cartridge 40 to the selected transfer station 293 and starts sending (at block 456) I/O requests directed toward the target data storage cartridge to the selected transfer station 293.

Figure 30:
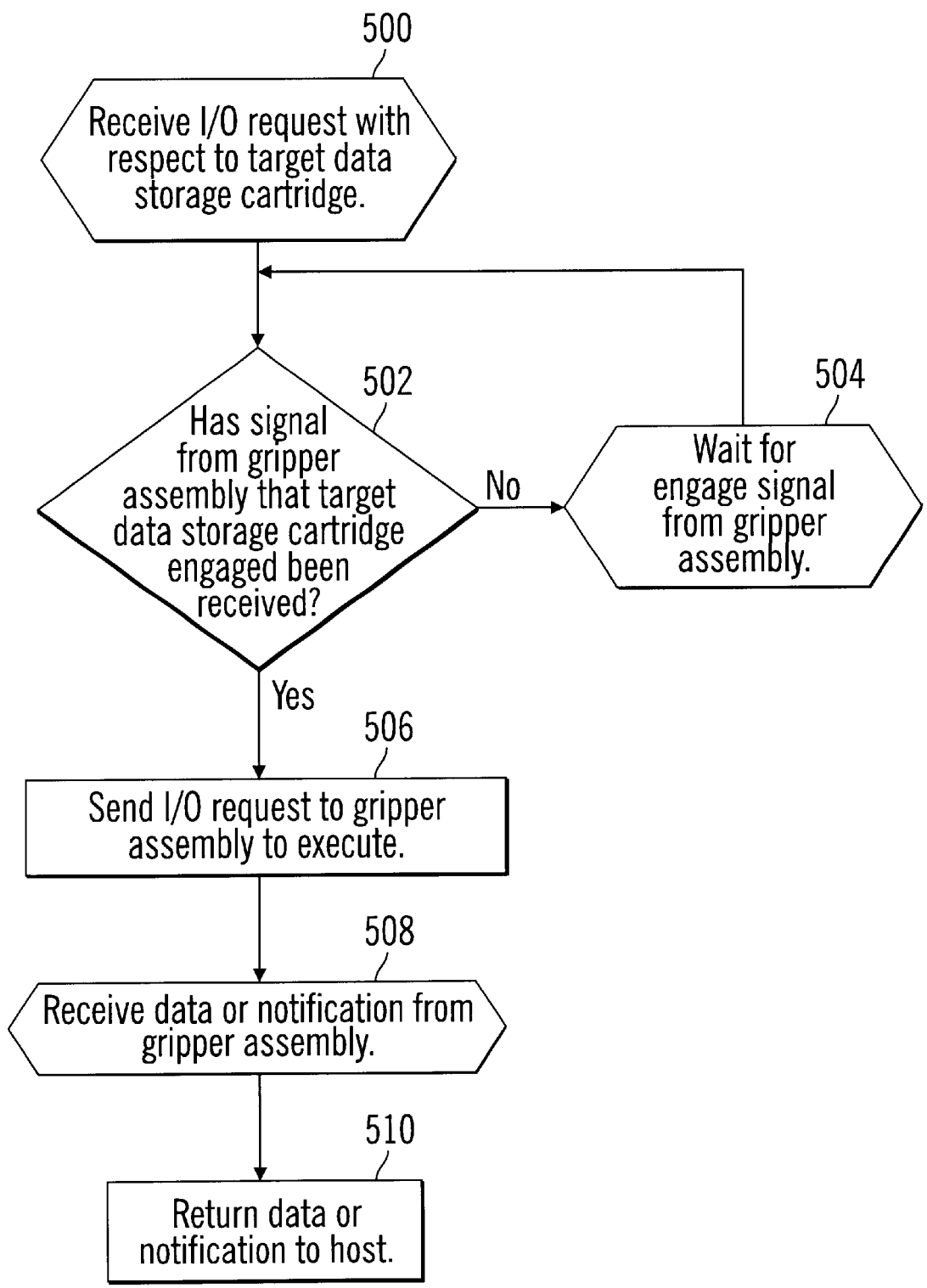

FIG. 29 illustrates logic implemented in the gripper controller 350 to respond (at block 470) to the request from the library controller 400 to move the target data storage cartridge 40 to the selected transfer station 293. In response, the gripper assembly 299 moves (at block 472) to the storage shelve and engages the target data storage cartridge 40. The gripper assembly 299 then supplies (at block 474) power to the data storage cartridge 40 upon detecting electrical contact with the data storage cartridge 40. The gripper assembly 299 may include the station power transfer interface and electrical contact verification system described with respect to FIG. 23 to supply power to the data storage cartridge 40 in a manner that avoids electrical spikes. The gripper assembly 299 sends (at block 476) a signal to the selected transfer station 293 indicating that the data storage cartridge is engaged. Upon engagement and supplying power, the gripper assembly 299 may prepare the storage medium within the data storage cartridge 40 for I/O operations. For instance, if the data storage medium comprises a hard disk drive, then gripper assembly 299 may begin spinning the disk(s). FIG. 30 illustrates logic implemented in the transfer station 293 to process I/O requests received (at block 500) from the library controller 400 with respect to the target data storage cartridge 40. If (at block 502) the engagement signal has not yet been received from the gripper assembly 299, then the transfer station 293 waits (at block 504) to receive the engagement signal from the gripper assembly 299. Once the signal is received, the transfer station 293 starts sending (at block 506) I/O requests directed toward the target data storage cartridge 40 to the gripper assembly 299. Upon receiving (at block 508) data or notification from the gripper assembly 299 related to the execution of an I/O request, the transfer station 293 transmits (at block 510) the returned data or notification to the requesting host 404. In alternative implementations, the transfer station 293 may send the I/O requests to the gripper assembly 299 before receiving the engagement signal from the gripper assembly 299. In such case, the gripper assembly 299 would buffer the I/O requests until the data 354 and power 356 transfer interfaces are engaged and operational with respect to the data storage cartridge 40.

FIG. 31 illustrates logic implemented in the gripper controller 350 to process I/O requests received from the transfer station 293. Upon reaching the destination at block 530, the gripper controller 350 sends (at block 532) a message to the transfer station 293 that the destination has been reached. The destination may be the transfer station 293 opening or may be another picker to which the data storage cartridge 360 is transferred to insert in the transfer station 293 so that the data storage cartridge data interface mates with the interfaces within the transfer station 293. The gripper controller 350 then completes (at block 534) execution of the I/O request currently being processed and sends notification to the transfer station 293 indicating the last executed I/O request. The gripper assembly 299 then performs (at block 536) an operation to rotate the data storage cartridge 40 180 degrees so that the interface on the data storage cartridge 40 faces the transfer station 293 opening. At this point, the data storage cartridge 40 may be inserted into the transfer station 293.

In additional implementations, the gripper assembly 299 may grip the cartridge 40 on the side opposite the data interface. This implementation improves performance because there is no delay experienced while the gripper assembly 299 has to flip or rotate the cartridge 40 before insertion into the transfer station 293. In such implementations, the data storage cartridge 40 body may include an additional power contact hole on the side of the cartridge opposite the data interface to allow the gripper assembly 299 to supply power to the data cartridge 40 while engaged with the storage cartridge 40 on the side opposite the data and power interface, which the transfer station 293 engages. This arrangement allows the gripper assembly 299 to complete the power initialization before the data storage cartridge 40 is provided to the transfer station 293. Further, in such implementations, there is no interruption of power supply to the data storage cartridge 40 when transferring the data storage cartridge 40 from the gripper assembly 299 to the transfer station 293 because the transfer station 293 may immediately begin supplying power after the gripper assembly 299 stops supplying power on the other power contact.

FIG. 32 illustrates logic implemented in the transfer station 293 upon receiving (at block 550) notification from the gripper assembly 293 that the destination is reached and the last I/O executed. In response, the station controller 372 indicates (at block 552) the last I/O executed to determine where to begin processing I/O requests. The station controller 372 would further stop (at block 554) any further I/O requests to the target data storage cartridge 40 to the gripper assembly 554. The station controller 372 would then wait (at block 556) for the data storage cartridge 50 to engage the data 376 and power 378 transfers interfaces before executing the I/O requests against the data storage cartridge 40, starting from the I/O request following the last I/O request executed by the gripper assembly 293.

With the tape library architecture of FIG. 27 and logic of FIGS. 28–32, the gripper assembly 299 may supply power to the data storage cartridge 40 while transferring the cartridge 40 from a storage shelve to the transfer station 293 so that the by the time the data storage cartridge 40 reaches the transfer station 293, the data storage cartridge 40 is ready to transfer data. Moreover, the gripper assembly 299 may further execute I/O requests on behalf of the transfer station 293 to improve the I/O performance with respect to processing the host 404 I/O requests. For instance, the transfer station 293 may relay I/O requests to the gripper assembly 299 to execute. The gripper assembly 299 would then return any data or messages related to the executed I/O requests back to the transfer station 293.

In the described implementations, the gripper assembly 299 supplies power to the data storage cartridge 40 before the cartridge 40 is provided to the transfer station 293 to optimize performance. This provides substantial performance benefits because of the time required to time to spin a hard disk drive to 10 or 15 thousand rotations per minute (RPMs). With the described implementations, the data transfer at the transfer station 293 is not delayed while the hard disk drive spins-up because the spin-up would have been performed while the data storage cartridge 40 was engaged with the gripper assembly 299.

The performance benefits of the described implementations increase as the distance between the transfer station 293 and storage shelf including the target data storage cartridge 40 increases. For instance, in large automated libraries, the gripper assembly 299 may have to move horizontally along a track through the library housing to an available transfer station 293. With the described implementations, the distance of the transfer will not adversely affect performance because the gripper assembly 299 may immediately begin processing I/O requests en route to the destination transfer station 293. In prior art tape library system, performance can be adversely impacted by delay times associated with the process of demounting a currently inserted data storage cartridge and having another picker remove the currently inserted data storage cartridge. With the described implementations, the gripper assembly 299 can access, move, supply power, and allow execution of I/O requests to the target data storage cartridge 40 while the transfer station 293 is involved in the process of removing the currently inserted data storage cartridge. Thus, with the described gripper assembly implementation, I/O performance is not adversely affected by the transfer station 293 operations to dismount and remove a data storage cartridge.

Still further, for limited I/O requests, the gripper assembly 299 may move to a storage shelf including the target data storage cartridge 40 and perform the I/O operation without actually transferring the data storage cartridge to the transfer station 293.

Thus, not only does the use of the data storage cartridge implementation described above improve performance by utilizing a faster access storage medium, such as a hard disk drive, but the performance with respect to the data storage cartridge is further improved by providing power to the data storage cartridge before the storage cartridge is engaged with the transfer station.

Additional Implementation Details

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

In the described implementations, the gripper assembly 299 moves the data storage cartridge to the transfer station 293. However, in alternative implementations, the library may include multiple grippers transferring data storage cartridges throughout the system.

In the described implementations, the gripper assembly 299 communicated data from the engaged data storage cartridge 40 to the transfer station 293 to transmit to the host 404. Additionally, the gripper assembly 299 may directly transfer data from the engaged data storage cartridge 40 to the host 404, bypassing the transfer station 293.

In one described implementation, the library controller 400 transmitted I/O requests to the transfer station 293, which in turn forwarded the I/O requests to the gripper assembly 299. Alternatively, the library controller 400 may send the I/O requests directly to the gripper assembly 299. When the data storage cartridge 40 is inserted in the transfer station 293, the library controller 400 could then start sending the I/O requests to the transfer station 293.

FIG. 10 illustrates one possible implementation of the automated library, including columns of storage arrays with the transfer stations directly in the column of the storage shelves. In additional implementations, the library may comprise a large enclosure and the gripper assembly may be capable of moving along a track to different storage arrays and bays of drive interfaces.

The logic implementation of FIGS. 28–32 describes specific operations occurring in a particular order. In alternative embodiments, certain of the logic operations may be performed in a different order, modified or removed and still implement preferred embodiments of the present invention. Morever, steps may be added to the above described logic and still conform to the preferred embodiments.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A storage library for storing data, comprising:
    a data storage cartridge including a data storage device, wherein the data storage device includes a storage medium and a power supply;
    a transfer station including an interface capable of mating with the data storage cartridge to perform data transfer operations with respect to the storage medium in the data storage device;
    a gripper assembly including:
        an interface capable of engaging the data storage cartridge and supplying power to the data storage device power supply; and
        movement electronics for moving the data storage cartridge to the transfer station and inserting the data storage cartridge in the transfer station.

2. The storage library of claim 1, wherein the data storage cartridge comprises a cartridge shell comprising a substantially identical exterior dimensional form factor as a tape cartridge with a leader block, wherein the leader block comprises a hole therethrough for engagement by a threading pin, and wherein the cartridge shell further includes on at least one side of a location of the leader block hole, to differentiate identification of the data storage cartridge from the tape cartridge, wherein the cartridge shell mounting the data storage device therein.

3. The storage library of claim 1, wherein the gripper assembly interface is further capable of communicating data between the gripper assembly and the storage medium of the data storage device.

4. The storage library of claim 3, wherein the gripper assembly includes:
    an electrical contact verification sensor to detect electrical contact with the data storage cartridge; and
    a power source to supply power to the data storage device power after detecting electrical contact with the data storage cartridge.

5. The storage library of claim 1, wherein the gripper assembly further includes a controller implementing logic to perform:
    receiving an I/O request with respect to the data storage cartridge engaged in the gripper assembly;
    executing the received I/O request; and
    in response to executing the received I/O request, transmitting data related to the executed I/O request.

6. The storage library of claim 5, wherein the logic implemented in the controller included in the gripper assembly is a gripper assembly controller logic, wherein the received I/O request is generated from an external device, wherein the gripper assembly controller logic further transmits the data related to the received I/O request to the external device.

7. The storage library of claim 5, wherein the logic implemented in the controller included in the gripper assembly is a gripper assembly controller logic, wherein the received I/O request is generated from an external device, wherein the gripper assembly controller logic further transmits the data related to the received I/O request to the transfer station, and wherein the transfer station controller further transmits the data related to the received I/O request to the external device.

8. The storage library of claim 5, wherein the transfer station further includes a controller implementing logic to perform:
    receiving an I/O request with respect to the data storage cartridge engaged by the gripper assembly; and
    transmitting the I/O request to the gripper assembly, wherein the received I/O request executed by the gripper assembly controller is transmitted from the transfer station.

9. The storage library of claim 8, wherein the gripper assembly controller further implements logic to transmit a signal to the transfer station indicating that the data storage cartridge is engaged; and
    wherein the transfer station controller further implements logic to transmit the I/O request to the gripper assembly after receiving the signal from the gripper assembly indicating that the data storage cartridge is engaged.

10. The storage library of claim 1, wherein the data storage cartridge includes a first and second power interfaces capable of supplying power to the data storage device.

11. The storage library of claim 10, wherein the gripper assembly interface and transfer station are capable of supplying power to the data storage device through the first and second power interfaces on the data storage cartridge, respectively.

12. The storage library of claim 11, wherein the gripper assembly supplies power to the data storage device through the first power interface while moving the data storage cartridge to the transfer station.

13. The storage library of claim 12, wherein the data storage device comprises a hard disk drive, and wherein the gripper assembly supplies power to the data storage device through the first power interface to spin the hard disk drive before inserting the data storage cartridge in the transfer station.

14. The storage library of claim 1, wherein the gripper assembly comprises a first gripper assembly, further comprising:
    a second gripper assembly, wherein the first gripper assembly passes the data storage cartridge to the second gripper assembly, and wherein the second gripper assembly inserts the data storage cartridge in the transfer station.

15. The storage library of claim 1, wherein the power is capable of being supplied from the interface included in the gripper assembly to the data storage power supply prior to inserting the data storage cartridge in the transfer station, and wherein the gripper assembly is capable of executing I/O operations with respect to the data storage cartridge prior to inserting the data storage cartridge in the transfer station.

16. A method for storing data in a storage library including a gripper assembly, transfer station, and at least one data storage cartridge, comprising:

engaging, with the gripper assembly, a data storage cartridge including a data storage device, wherein the data storage device includes a storage medium and a power supply;

supplying power, with the gripper assembly, to the data storage device power supply;

moving, with the gripper assembly, the data storage cartridge to the transfer station and inserting the data storage cartridge in the transfer station; and performing, with the transfer station, data transfer operations with respect to the storage medium in the data storage device.

17. The method of claim 16, wherein the data storage cartridge comprises a cartridge shell comprising a substantially identical exterior dimensional form factor as a tape cartridge with a leader block, wherein the leader block comprises a hole therethrough for engagement by a threading pin, and wherein the cartridge shell further includes on at least one side of a location of the leader block hole, to differentiate identification of the data storage cartridge from the tape cartridge, wherein the cartridge shell mounting the data storage device therein.

18. The method of claim 16, further comprising:
communicating, with the gripper assembly, between the gripper assembly and the storage medium of the data storage device.

19. The method of claim 16, further comprising:
receiving, with the gripper assembly, an I/O request with respect to the data storage cartridge engaged in the gripper assembly;

executing, wit the gripper assembly, the received I/O request; and transmitting, with the gripper assembly, data related to the executed I/O request in response to executing the received I/O request.

20. The method of claim 19, wherein the received I/O request is generated from an external device, further comprising transmitting, with the gripper assembly, the data related to the received I/O request to the external device.

21. The method of claim 19, wherein the received I/O request is generated from an external device, further comprising:

transmitting, with the gripper assembly, the data related to the received I/O request to the transfer station; and transmitting, with the transfer station, the data related to the received I/O request to the external device.

22. The method of claim 19, wherein the transfer station further performs:

receiving an I/O request with respect to the data storage cartridge engaged by the gripper assembly; and transmitting the I/O request to the gripper assembly, wherein the received I/O request executed by the gripper assembly controller is transmitted from the transfer station.

23. The method of claim 22, further comprising:
transmitting, with the gripper assembly, a signal to the transfer station indicating that the data storage cartridge is engaged; and transmitting, with the transfer station, the I/O request to the gripper assembly after receiving the signal from the gripper assembly indicating that the data storage cartridge is engaged.

24. The method of claim 16, wherein the gripper assembly supplies power to the data storage device through the first power interface while moving the data storage cartridge to the transfer station.

25. The method of claim 16, wherein the gripper assembly supplies power to the data storage device to spin the hard disk drive before inserting the data storage cartridge in the transfer station.

26. The method of claim 16, wherein the gripper assembly comprises a first gripper assembly, further comprising:

passing, with the first gripper assembly, the data storage cartridge to a second gripper assembly; and inserting, with a second gripper assembly, the data storage cartridge in the transfer station.

27. The method of claim 16, wherein the power is capable of being supplied from the interface included in the gripper assembly to the data storage power supply prior to inserting the data storage cartridge in the transfer station, and wherein the gripper assembly is capable of executing I/O Operations with respect to the data storage cartridge prior to inserting the data storage cartridge in the transfer station.

28. An article of manufacture including logic for controlling a gripper assembly and transfer station to manage data in a storage library including at least one data storage cartridge by causing the gripper assembly and transfer station to perform:

engaging, with the gripper assembly, a data storage cartridge including a data storage device, wherein the data storage device includes a storage medium and a power supply;

supplying power, wit the gripper assembly, to the data storage device power supply; and moving, with the gripper assembly, the data storage cartridge to a transfer station and inserting the data storage cartridge in the transfer station; and performing, wit the transfer station, data transfer operations with respect to the storage medium in the data storage device inserted into the transfer station.

29. The article of manufacture of claim 28, wherein the data storage cartridge comprises a cartridge shell comprising a substantially identical exterior dimensional from factor as a tape cartridge with a leader block, wherein the leader black comprises a hole therethrough for engagement by a threading pin, and wherein the cartridge shell further includes on at least one side of a location of the leader block hole, to differentiate identification of the data storage cartridge from the tape cartridge, wherein the cartridge shell mounting the data storage device therein.

30. The article of manufacture of claim 28, further including logic to cause the gripper assembly to perform:

communicating between the gripper assembly and the storage medium of the data storage device.

31. The article of manufacture of claim 28, further including logic to cause the gripper assembly to perform:

receiving an I/O request with respect to the data storage cartridge engaged in the gripper assembly;

executing the received I/O request; and in response to executing the received I/O request, transmitting data related to the executed I/O request.

32. The article of manufacture of claim 31, wherein the received I/O request is generated from an external device, further including logic to cause the gripper assembly to perform:

transmitting the data related to the received I/O request to the external device.

33. The article of manufacture of claim 31, wherein the received I/O request is generated from an external device, further including logic to cause the gripper assembly and transfer station to perform:

transmitting, with the gripper assembly, the data related to the received I/O request to the transfer station; and transmitting, with the transfer station, the data related to the received I/O request to the external device.

34. The article of manufacture of claim 31, further including logic to cause the transfer station to perform:

receiving an I/O request with respect to the data storage cartridge engaged by the gripper assembly; and transmitting the I/O request to the gripper assembly, wherein the received I/O request executed by the gripper assembly controller is transmitted from the transfer station.

35. The article of manufacture of claim 34, further including logic to cause the gripper assembly and transfer station to perform:

transmitting, with the gripper assembly, a signal to the transfer station indicating that the data storage cartridge is engaged; and transmitting, with the transfer station, the I/O request to the gripper assembly after receiving the signal from the gripper assembly indicating that the data storage cartridge is engaged.

36. The article of manufacture of claim 28, further including logic to cause the gripper assembly to perform supplying power to the data storage device while moving the data storage cartridge to the transfer station.

37. The article of manufacture of claim 28, wherein the gripper assembly supplies power to the data storage device to spin the hard disk drive before inserting the data storage cartridge in the transfer station.

38. The article of manufacture of claim 28, wherein the gripper assembly comprises a first gripper assembly, further including logic to cause the first and second gripper assemblies to perform:

passing, with the first gripper assembly, the data storage cartridge to a second gripper assembly; and inserting, with the second gripper assembly, the data storage cartridge in the transfer station.

39. The article of manufacture of claim 28, wherein the power is capable of being supplied from the interface included in the gripper assembly to the data storage power supply prior to inserting the data storage cartridge in the transfer station, and wherein the gripper assembly is capable of executing I/O operations with respect to the data storage cartridge prior to inserting the data storage cartridge in the transfer station.

* * * * *

UNITED STATES PATENT AND TRADEMARK OFFICE
CERTIFICATE OF CORRECTION

PATENT NO. : 6,826,004 B2 Page 1 of 1
APPLICATION NO. : 09/844975
DATED : November 30, 2004
INVENTOR(S) : Thomas Robert Albrecht, Robert Beverly Basham and James Mitchell Karp It is certified that error appears in the above-identified patent and that said Letters Patent is hereby corrected as shown below:

Column 19, line 31, delete "wit" and insert -- with --.

Column 20, line 15, delete "Operation" and insert -- operation --.
Line 28, delete "wit" and insert -- with --.
Line 33, delete "wit" and insert -- with --.
Line 38, delete "from" and insert -- form --.
Line 39, delete "black" and insert -- block --.

Signed and Sealed this

Fourteenth Day of November, 2006

JON W. DUDAS
*Director of the United States Patent and Trademark Office*